United States Patent
Wada

(10) Patent No.: US 9,635,238 B2
(45) Date of Patent: Apr. 25, 2017

(54) IMAGING APPARATUS AND METHOD FOR CONTROLLING THE SAME

(71) Applicant: CANON KABUSHIKI KAISHA, Tokyo (JP)

(72) Inventor: Akiko Wada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 25 days.

(21) Appl. No.: 14/138,645

(22) Filed: Dec. 23, 2013

(65) Prior Publication Data

US 2014/0184889 A1    Jul. 3, 2014

(30) Foreign Application Priority Data

Dec. 27, 2012   (JP) ................... 2012-285259

(51) Int. Cl.
    *H04N 5/232*    (2006.01)
    *H04N 5/235*    (2006.01)
    *H04N 5/369*    (2011.01)

(52) U.S. Cl.
    CPC ....... *H04N 5/23212* (2013.01); *H04N 5/2356* (2013.01); *H04N 5/3696* (2013.01)

(58) Field of Classification Search
    CPC ............. H04N 5/23212; H04N 5/2356; H04N 5/3696; G02B 7/36; G02B 7/365; G02B 7/102; G03B 13/36
    See application file for complete search history.

(56) References Cited

U.S. PATENT DOCUMENTS

| | | | |
|---|---|---|---|
| 2003/0202115 A1* | 10/2003 | Sugimoto | H04N 5/217 348/362 |
| 2005/0174451 A1 | 8/2005 | Nozaki | |
| 2006/0127084 A1* | 6/2006 | Okada | H04N 5/23232 396/439 |
| 2007/0189753 A1 | 8/2007 | Koguchi | |
| 2008/0089616 A1 | 4/2008 | Gwak | |
| 2008/0122940 A1* | 5/2008 | Mori | H04N 5/23212 348/222.1 |
| 2008/0143865 A1 | 6/2008 | Kimoto | |
| 2008/0232780 A1 | 9/2008 | Yamada | |
| 2010/0073549 A1 | 3/2010 | Sekine | |
| 2010/0134644 A1 | 6/2010 | Kita | |
| 2010/0209094 A1* | 8/2010 | Uehara | G02B 27/28 396/125 |
| 2012/0212641 A1 | 8/2012 | Tezuka | |
| 2012/0300083 A1* | 11/2012 | Funamoto | G02B 7/343 348/169 |

FOREIGN PATENT DOCUMENTS

| | | |
|---|---|---|
| CN | 101931752 A | 12/2010 |
| JP | 2007-116236 A | 5/2007 |

(Continued)

*Primary Examiner* — Luong T Nguyen
(74) *Attorney, Agent, or Firm* — Canon USA Inc., IP Division

(57) ABSTRACT

An imaging apparatus control method includes acquiring an image signal by photoelectrically converting an object image and performing control in such a way as to execute a first continuous shooting mode and a second continuous shooting mode based on the image signal, wherein an image capturing condition in the first continuous shooting mode is different from an image capturing condition in the second continuous shooting mode.

10 Claims, 23 Drawing Sheets

(56) References Cited

FOREIGN PATENT DOCUMENTS

| | | |
|---|---|---|
| JP | 2008-236482 A | 10/2008 |
| JP | 2009-218725 A | 9/2009 |
| JP | 2010-199727 A | 9/2010 |
| JP | 2010-224560 A | 10/2010 |
| JP | 2012-4716 A | 1/2012 |
| JP | 2012-156747 A | 8/2012 |

* cited by examiner

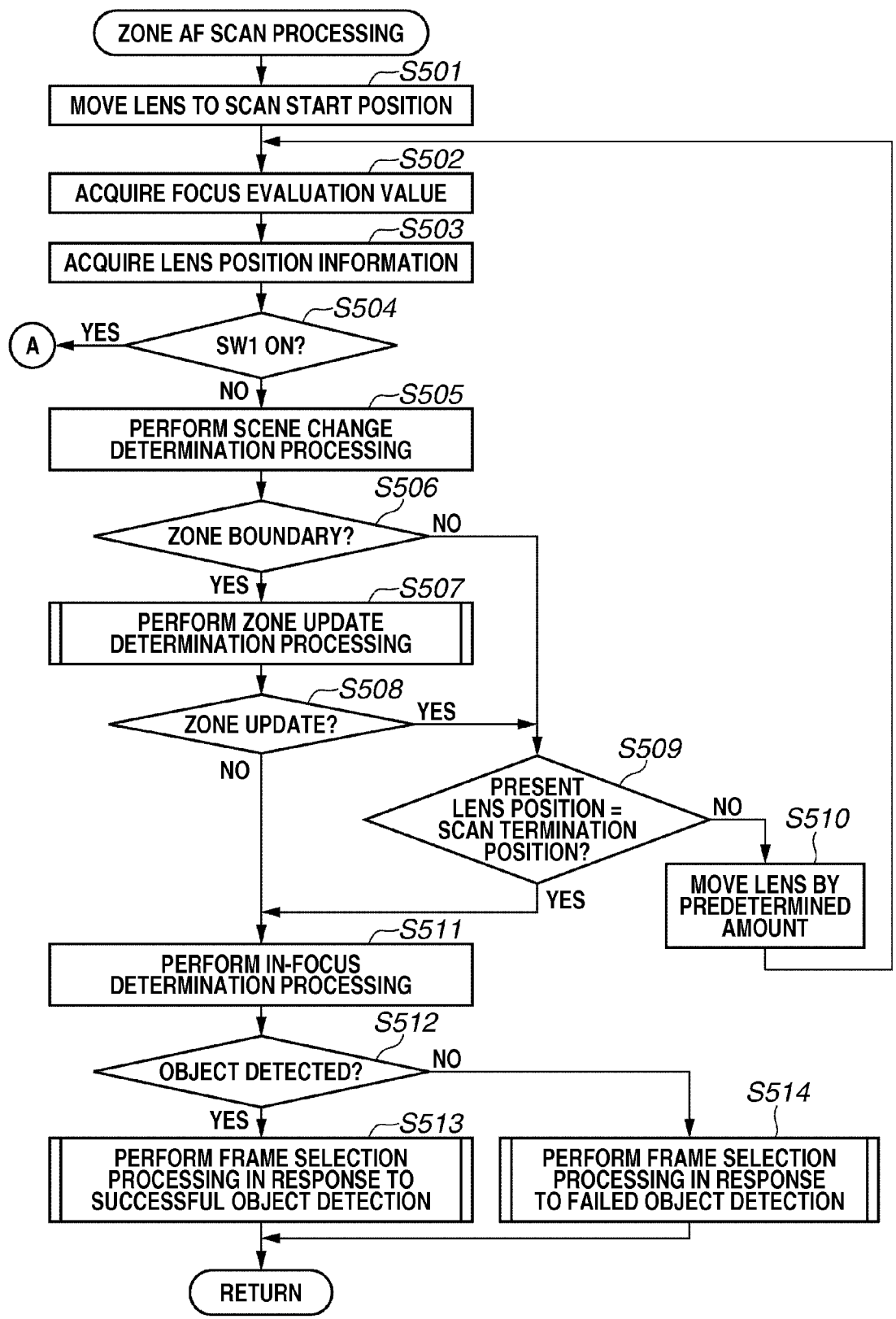

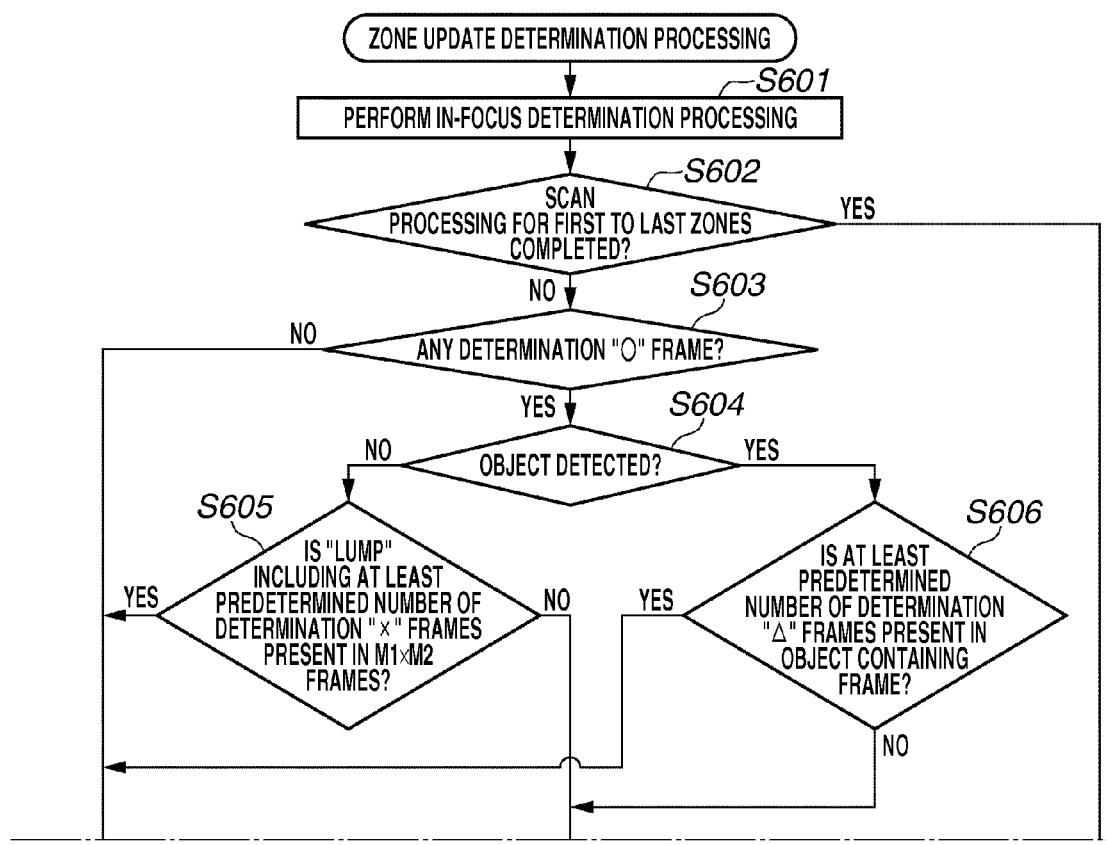

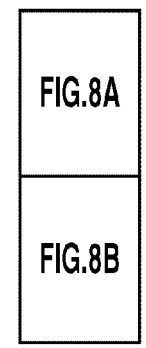
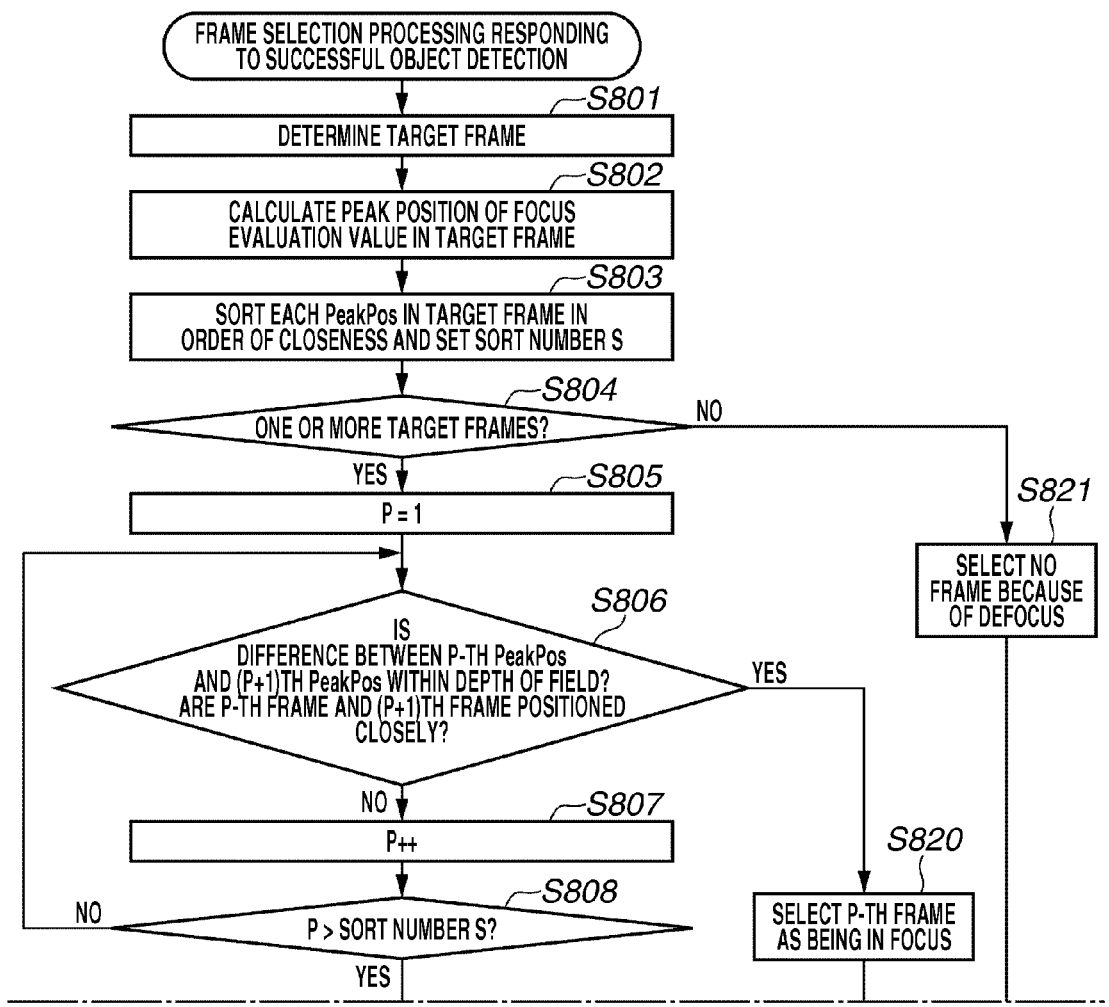

| × | 102 | × | × | × | × | × |
|---|---|---|---|---|---|---|
| × | × | × | × | × | × | × |
| 100 | 100 | 102 | × | × | × | × |
| 101 | 101 | 200 | 200 | 102 | 101 | 100 |
| 101 | 201 | 202 | 202 | 101 | 101 | 100 |
| 102 | 202 | 201 | 201 | 103 | 102 | 100 |
| 101 | 202 | 201 | 200 | 103 | 101 | 100 |
| 103 | 100 | 200 | 199 | 102 | 101 | 100 |
| 103 | 102 | 201 | 200 | 102 | 100 | 100 |

FIG.10C

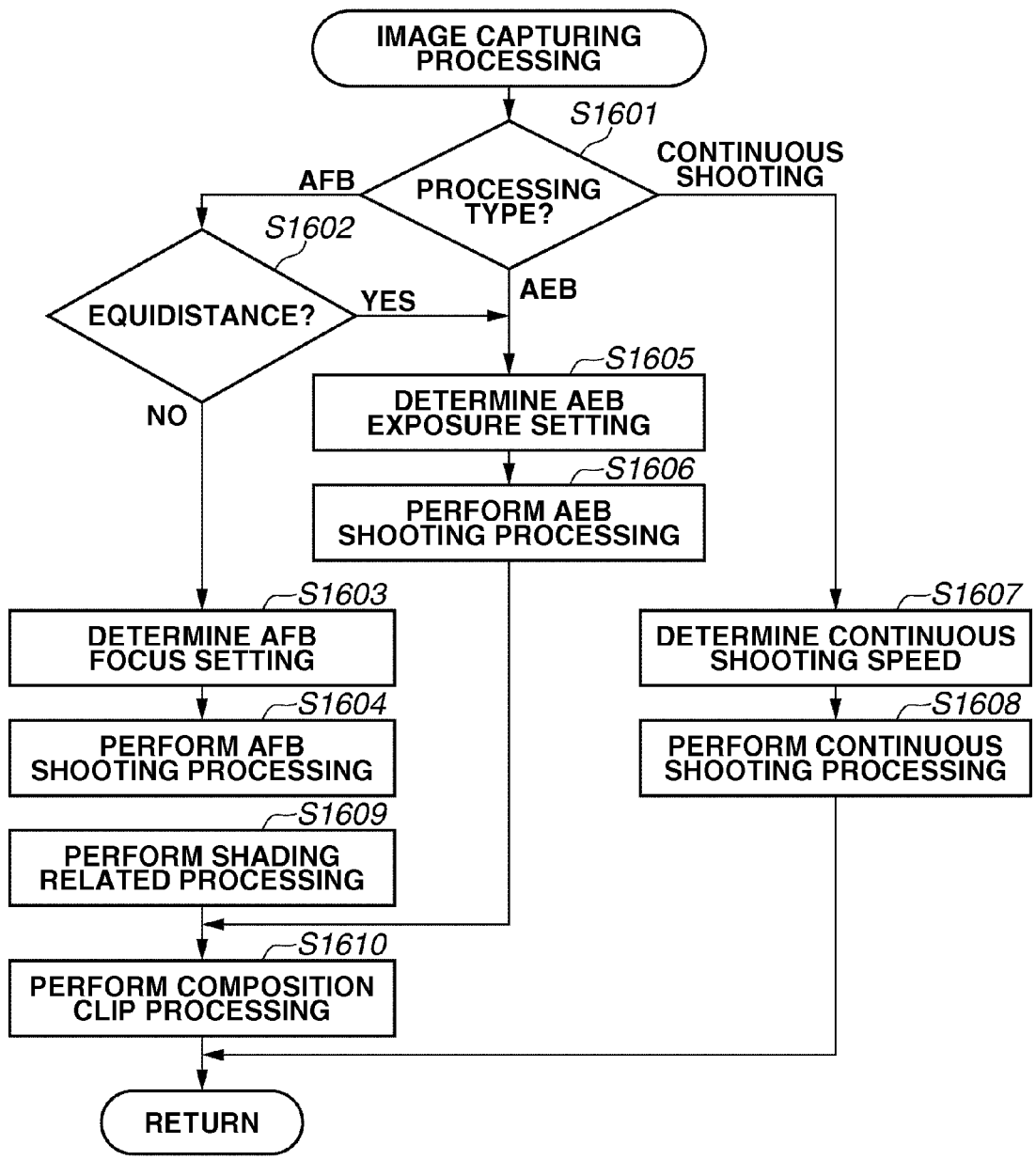

FIG.20A
FIG.20B
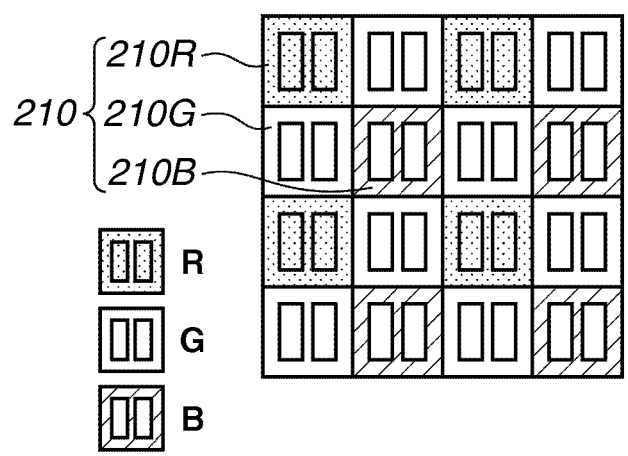
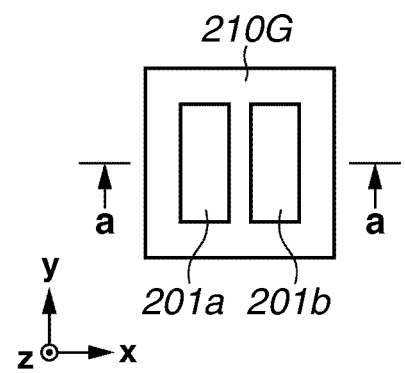
FIG.20C
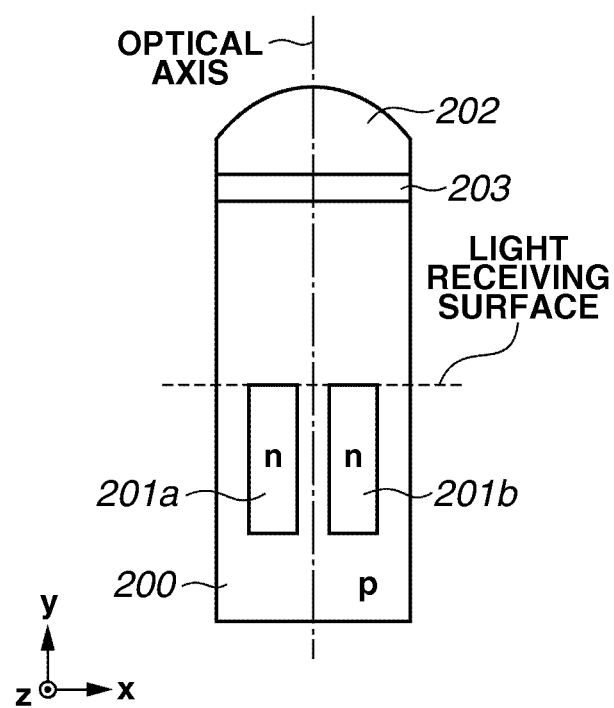

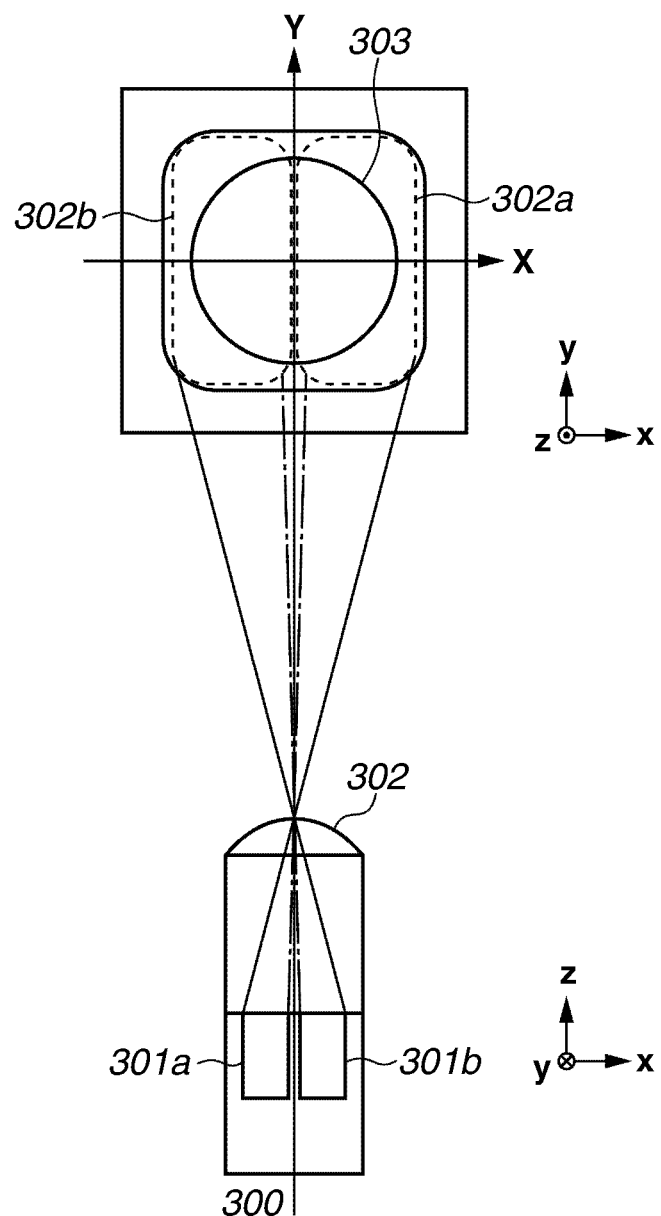

IMAGING APPARATUS AND METHOD FOR CONTROLLING THE SAME

BACKGROUND OF THE INVENTION

Field of the Invention

The present invention relates to an imaging apparatus that acquires an image signal and a method for controlling the imaging apparatus.

Description of the Related Art

Conventionally, when an electronic still camera or a video camera performs auto focus (referred to as "AF") processing, a focus lens position where a high-frequency component of a luminance signal obtained by an image sensor including a charge-coupled device (CCD) is maximized is set as an in-focus position. One of such conventional methods is a scanning method. More specifically, the scanning method includes storing an evaluation value based on the high-frequency component of the luminance signal obtained by the image sensor (which can be referred to as "focus evaluation value") for each focus lens position, while driving a focus lens in a predetermined focus detection range (e.g., the entire region).

The scanning method further includes setting an area (hereinafter, referred to as AF frame) to acquire the focus evaluation value at a central region of the screen or in the vicinity of an object detection area, acquiring a focus lens position corresponding to the maximum focus evaluation value (hereinafter, referred to as "peak position") in each AF frame, and determining the in-focus position in a shooting operation.

The above-mentioned scanning method is usable not only to determine the in-focus position in a shooting operation but also to acquire a distance distribution in the screen by setting a plurality of AF frames for determination in image processing.

As discussed in Japanese Patent Application Laid-Open No. 2012-4716, it is conventionally known to divide the screen into some areas based on object distance information and perform predetermined image processing on each scene determined for each divided area.

However, in a case where the depth of field of a scene is deep, the division accuracy may deteriorate if two or more divided areas are present within the same depth of field even when the area division is performed based on a difference in the object distance. Further, in a case where a scene is so flat that there is not any distance difference, the area division may be erroneously performed due to a deviation in the distribution even though the area division cannot be actually performed based on the distance.

In the above-mentioned conventional technique discussed in the Japanese Patent Application Laid-Open No. 2012-4716, the distance division may be erroneously performed because checking the distance division accuracy in the screen is not performed.

SUMMARY OF THE INVENTION

The present invention is directed to a technique capable of determining a scene in a shooting operation and appropriately performing image processing and image capturing processing based on a determination result.

According to one aspect of the present invention, an imaging apparatus control method includes acquiring an image signal by photoelectrically converting an object image and performing control in such a way as to execute a first continuous shooting mode and a second continuous shooting mode based on the image signal, wherein an image capturing condition in the first continuous shooting mode is different from an image capturing condition in the second continuous shooting mode.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 is a flowchart illustrating zone AF scan processing illustrated in FIG. 3.

FIG. 6A-6B is a flowchart illustrating zone update determination processing illustrated in FIG. 5.

FIG. 8A-8B is a flowchart illustrating frame selection processing responding to successful object detection illustrated in FIG. 5.

FIGS. 10A, 10B, and 10C illustrate the frame selection processing responding to failed object detection illustrated in FIG. 5.

FIG. 16 is a flowchart illustrating image capturing processing illustrated in FIG. 2.

FIGS. 20A, 20B, and 20C schematically illustrate a pixel array of an image sensor.

FIG. 21 illustrates a pupil division state of one pixel.

DESCRIPTION OF THE EMBODIMENTS

Various exemplary embodiments, features, and aspects of the invention will be described in detail below with reference to the drawings.

An electronic camera, which is an example of an imaging apparatus according to an exemplary embodiment of the present invention, is described in detail below with reference to the attached drawings. First, a first exemplary embodiment is described in detail below with reference to the attached drawings.

<Electronic Camera Configuration>

Figure 1:
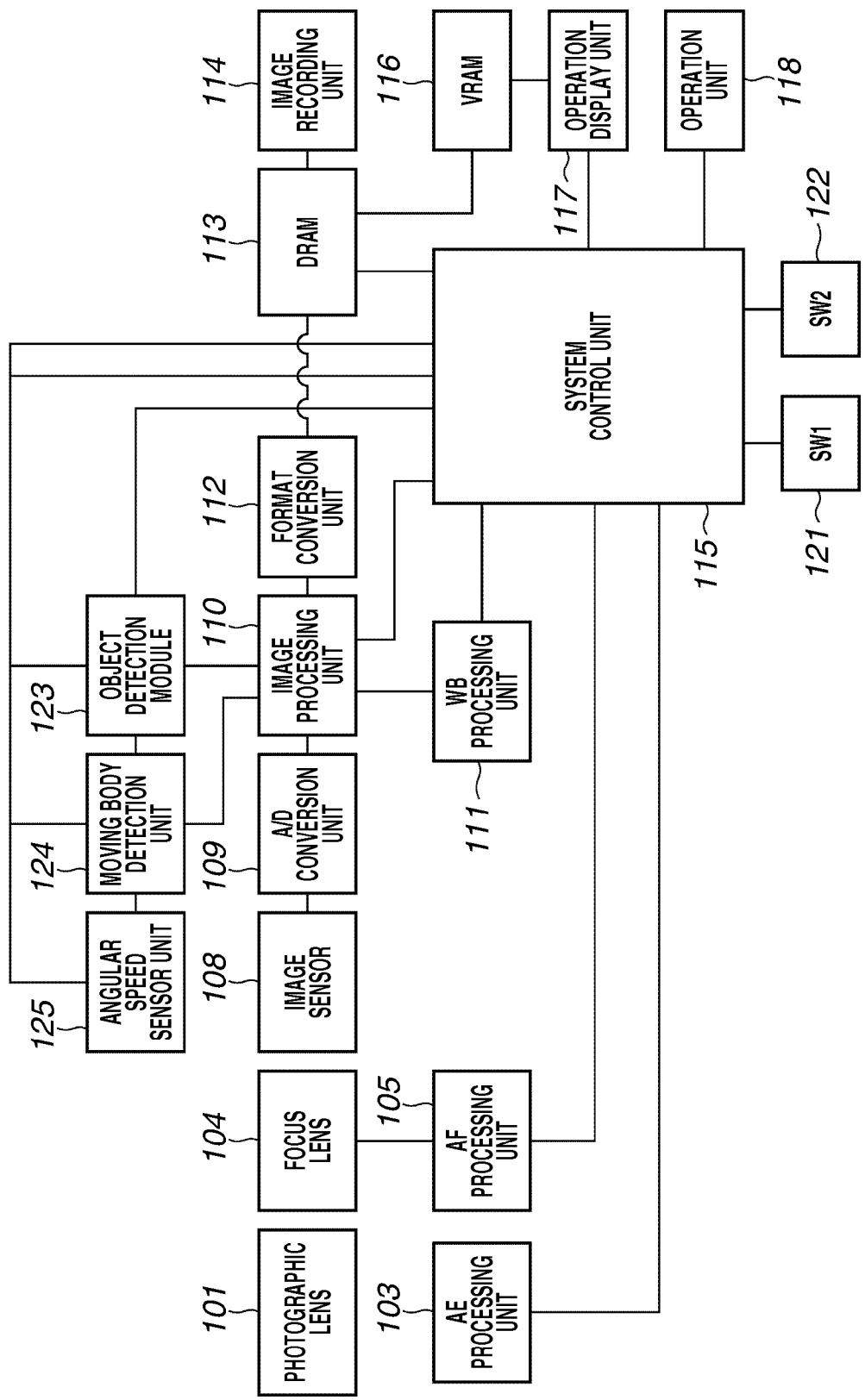
FIG. 1 is a block diagram illustrating an arrangement of an imaging apparatus according to an exemplary embodiment of the present invention.

FIG. 1 is a block diagram illustrating an arrangement of an electronic camera according to the present invention.

A photographic lens 101, which includes a zoom mechanism, is configured to change the focal length. An auto exposure (AE) processing unit 103 is configured to perform an exposure control to detect object luminance information. A focus lens 104 can focus an image on an image sensor 108. An auto focus (AF) processing unit 105 includes a focus lens driving motor that moves the focus lens 104. The image sensor 108 is functionally operable as a light receiving unit or a photoelectric conversion unit configured to convert an object image (i.e., light reflected from an object imaged via the focus lens 104) into an electric signal. An analog/digital (A/D) conversion unit 109 includes a CDS circuit configured to remove a noise component from an output of the image sensor 108 and a nonlinear amplification circuit configured to nonlinearly amplify the input signal before being subjected to A/D conversion. The A/D conversion unit 109 is configured to convert an image signal output from the image sensor 108 from an analog signal to a digital signal.

An image processing unit 110 is configured to perform predetermined image processing on the signal received from the A/D conversion unit 109 and output image data. Further, the image processing unit 110 is configured to generate a focus evaluation value based on a luminance signal obtained from the output of the A/D conversion unit 109 and output the generated focus evaluation value to a system control unit 115. The focus evaluation value indicates the sharpness of an image, which can be generated based on a high-frequency component of the luminance signal. The position of the focus lens 104 that corresponds to a point where the focus evaluation value takes a peak level is an in-focus position (i.e., a peak position) where the object image is brought into an in-focus state.

A format conversion unit 112 is configured to process image data received from the image processing unit 110 and store the processed data in a high-speed built-in memory 113 (e.g., a random access memory), which is hereinafter referred to as "DRAM." Further, a WB processing unit 111 is configured to perform white balance processing on image data received from the image processing unit 110. In the present exemplary embodiment, the DRAM 113 is usable as a high-speed buffer (which is operable as a temporary image storage unit) or usable as a working memory when image compression/decompression is performed.

The image data stored in the DRAM 113 can be stored in an image recording unit 114. The image recording unit 114 includes a recording medium (e.g., a memory card) and an interface. The system control unit 115 (hereinafter, referred to as "CPU") is configured to control system operations (including shooting sequence). An image display memory 116 (hereinafter, referred to as "VRAM") is a memory that stores image data having been subjected to various image processing performed by the image processing unit 110). An operation display unit 117 is configured to display an image based on the image data stored in the VRAM 116 and display an operation assist screen. Further, the operation display unit 117 can display a present camera state and can display an image frame together with an AF frame (i.e., a focus detection area) when a shooting operation is performed.

An operation unit 118 is configured to enable a user to operate the camera. For example, the operation unit 118 includes a menu switch operable to perform various settings (e.g., functional settings relating to image capturing processing and settings relating to image reproducing processing) for the imaging apparatus, a zoom lever operable to instruct a zoom operation of the photographic lens 101, and an operation mode change switch operable to switch between a shooting mode and a reproducing mode. A switch 121 (hereinafter, referred to as "SW1") is operable to perform a shooting standby (e.g., AF or AE) operation. A switch 122 is a shooting switch (hereinafter, referred to as "SW2") operable to perform a shooting operation after completing the operation of the switch SW1. An object detection module 123 is configured to detect an object based on an image signal processed by the image processing unit 110 and transmit information (e.g., position, magnitude, and reliability) about each detected object to the CPU 115.

An appropriate object detection method is usable, although not described in detail below. For example, the object detection module 123 can detect information (e.g., position, magnitude, and reliability) about a face as a main object. A moving body detection unit 124 is configured to detect a movement of an object or the background in an imaging screen and transmit moving body information to the CPU 115. More specifically, the moving body detection unit 124 compares image data of two time-sequentially arrayed images of the image data processed by the image processing unit 110 and acquires the moving body information (e.g., operation amount, position, and range) about the object/background based on obtained difference information. An angular speed sensor unit 125 is configured to detect a movement of the camera body and transmit camera movement information to the CPU 115.

<Electronic Camera Operations>

Next, operations that can be performed by the electronic camera are described in detail below with reference to a flowchart illustrated in FIG. 2.

First, in step S201, the CPU 115 checks the ON/OFF state of the switch SW1 that is operable to instruct a shooting preparation. If it is determined that the state of the switch SW1 is ON (Yes in step S201), the operation proceeds to step S208. If it is determined that the state of the switch SW1 is OFF (No in step S201), the operation proceeds to step S202.

In step S202, the CPU 115 performs scene stability determination processing to check if the state of the imaging scene is stable. In step S203, the CPU 115 determines whether the imaging scene is stable. If it is determined that the imaging scene is stable (Yes in step S203), the operation proceeds to step S204. If it is determined that the imaging scene is instable (No in step S203), the operation returns to step S201. In the present exemplary embodiment, the CPU 115 can determine that the state of the imaging scene is stable if the state of a shooting object and the state of the camera are maintained stably and suitable for shooting. For example, the CPU 115 can refer to a camera operation amount that can be detected by the angular speed sensor unit 125 or a luminance change amount that can be detected by the AE processing unit 103 in determining the stability of the imaging scene.

In step S204, the CPU 115 performs AF scan processing according to a procedure described below. In step S205, the CPU 115 performs continuous AF processing according to a procedure described below.

In step S206, the CPU 115 performs scene instability determination processing to check if the state of the imaging scene is instable. In step S207, the CPU 115 checks if the imaging scene has been determined as being instable in step S206. If it is determined that the imaging scene is instable (Yes in step S207), the operation returns to step S201. If it is determined that the imaging scene is stable (No in step S207), the operation proceeds to step S205.

In the present exemplary embodiment, the CPU 115 can determine that the imaging scene is instable if the state of the shooting object and the state of the camera are instable and not suitable for shooting. For example, the CPU 115 can refer to the camera operation amount detected by the angular speed sensor unit 125 or an object detection status or a detection position change amount that can be detected by the object detection module 123 in determining the instability of the imaging scene.

In step S208, the CPU 115 performs bracket determination processing to determine an optimum control (AF bracket, AE bracket, or continuous shooting) to be selected in a shooting operation according to a procedure described below. In step S209, the AE processing unit 103 performs main exposure AE processing. In step S210, the AF processing unit 105 performs main exposure AF processing according to a procedure described below. In step S211, the CPU 115 checks the ON/OFF state of the shooting switch SW2. If it is determined that the state of the shooting switch SW2 is ON (Yes in step S211), the operation proceeds to step S212. If it is determined that the state of the shooting switch SW2 is OFF (No in step S211), the operation returns to step S211.

In step S212, the CPU 115 performs image capturing processing according to a procedure described below.

<AF Scan Processing>

Figure 2:
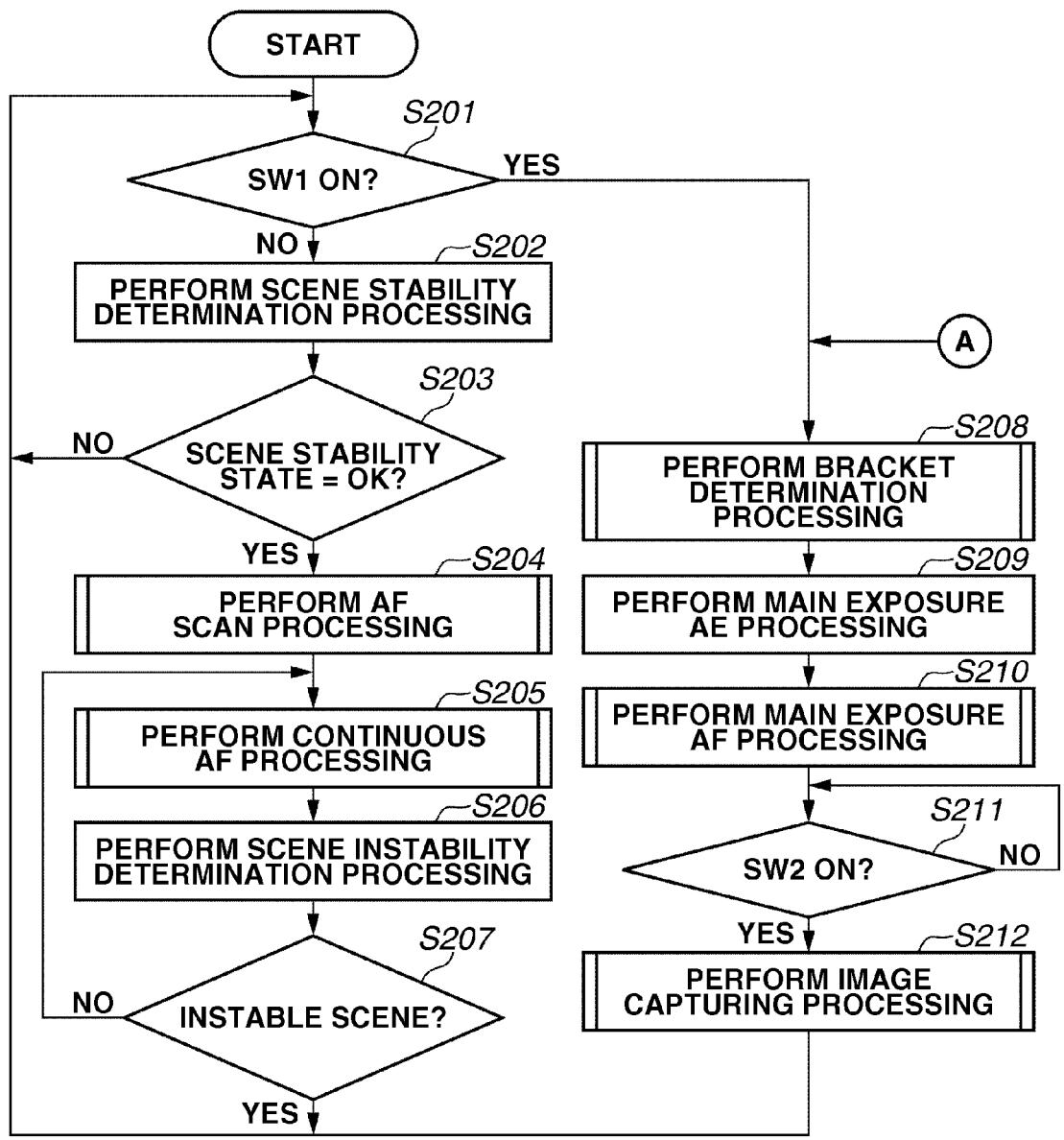
FIG. 2 is a flowchart illustrating an operation of the imaging apparatus according to an exemplary embodiment of the present invention.
Figure 3:
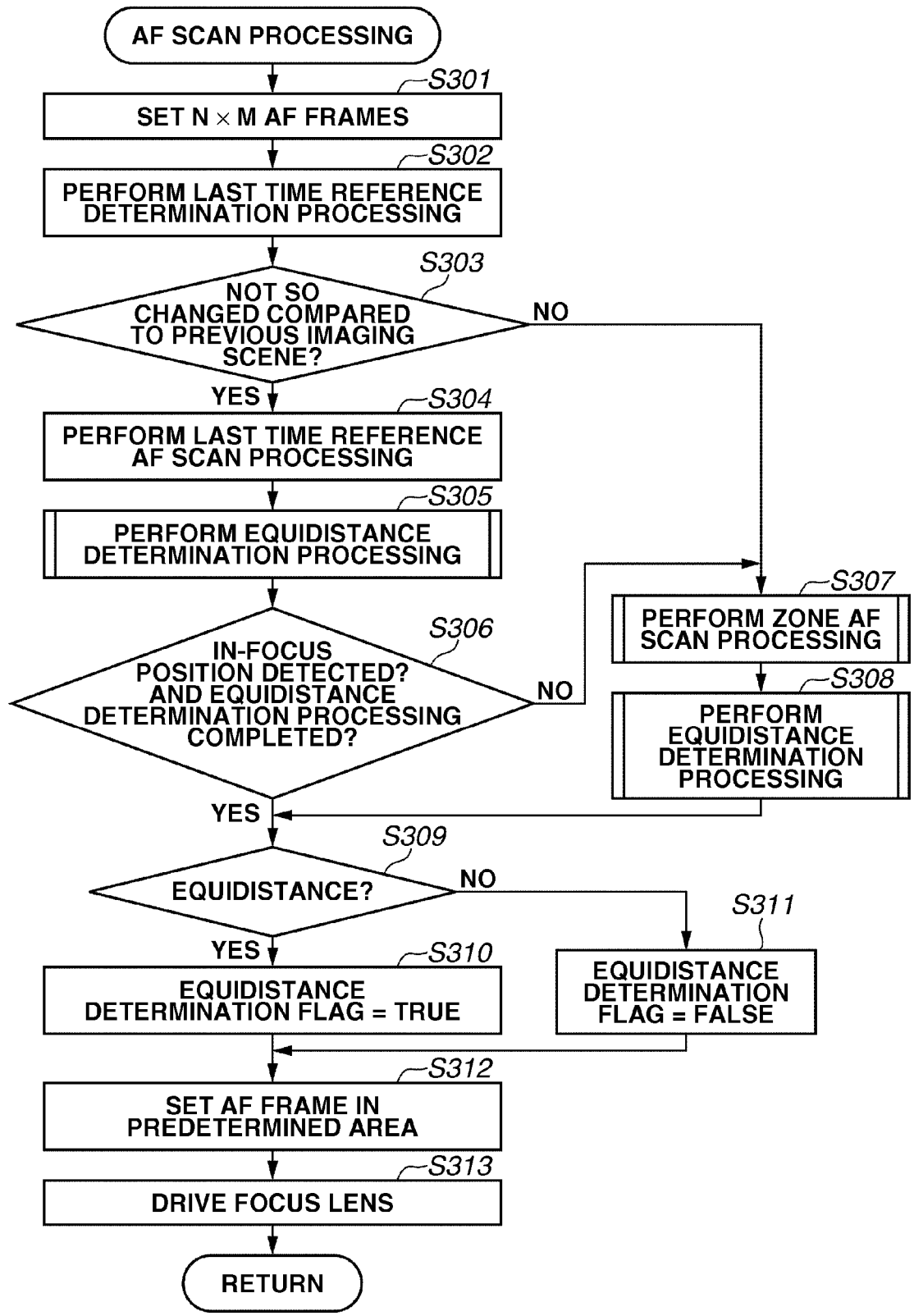
FIG. 3 is a flowchart illustrating AF scan processing illustrated in FIG. 2.

FIG. 3 is a flowchart illustrating the AF scan processing to be performed in step S204 illustrated in FIG. 2. In the present exemplary embodiment, the AF scan processing includes acquiring distance information to determine a scene that includes a distance difference between objects in the imaging screen (hereinafter, referred to as "equidistance determination processing") and performing an AF scan operation to determine an in-focus position. The AF processing unit 105 and the CPU 115 cooperatively perform the following processing.

Figure 4:
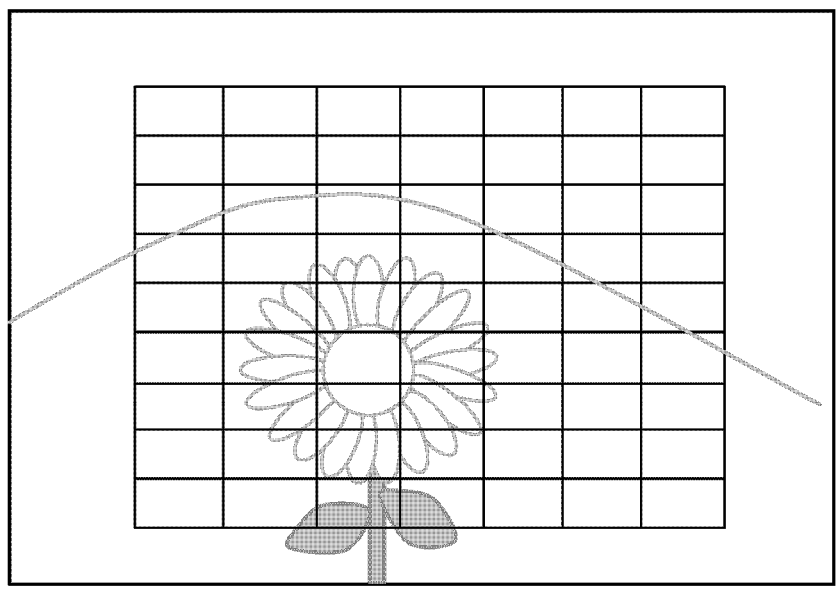
FIG. 4 illustrates an example of AF frame setting illustrated in FIG. 2.

First, in step S301, the CPU 115 sets N×M focus detection areas (i.e., AF frames) in the imaging screen. FIG. 4 illustrates an AF frame setting obtainable when N=7 and M=9. Alternatively, it is useful to set the AF frame setting range considering a specific position in the imaging screen where the object has been detected by the object detection module 123. For example, the CPU 115 can set a plurality of AF frames with reference to the position of the object if it has been detected successfully.

In step S302, the CPU 115 performs last time reference determination processing to check a difference between the present imaging scene and the last imaging scene. In step S303, the CPU 115 determines whether the present imaging scene is substantially the same as the last imaging scene. If the determination result is affirmative (Yes in step S303), the operation proceeds to step S304. Otherwise (No in step S303), the operation proceeds to step S307. In a case where the CPU 115 first performs the AF scan operation after the power source of the electronic camera is turned on, the operation automatically proceeds from step S303 to step S307. In step S304, the CPU 115 performs last time reference AF scan processing while setting a scan range only in the vicinity of the present position of the focus lens 104.

In step S305, the CPU 115 performs equidistance determination processing according to a procedure described below. In step S306, the CPU 115 determines whether the in-focus position has been detected in the last time reference AF scan processing performed in step S304 and determines whether the equidistance determination processing in step S305 has been completed. If the determination result is affirmative (Yes in step S306), the operation proceeds to step S309. Otherwise (No in step S306), the operation proceeds to step S307.

In step S307, the CPU 115 performs zone AF scan processing according to a procedure described below. In step S308, the CPU 115 performs equidistance determination processing according to a procedure described below.

In step S309, the CPU 115 checks if the equidistance is confirmed in the equidistance determination processing performed in step S305 or step S308. If the determination result is affirmative (Yes in step S309), the operation proceeds to step S310. Otherwise (No in step S309), the operation proceeds to step S311.

In step S310, the CPU 115 sets an equidistance determination flag to TRUE. In step S311, the CPU 115 sets the equidistance determination flag to FALSE.

In step S312, the CPU 115 sets AF frames in the object detection area if the object has been successfully detected by the object detection module 123 (i.e., when the object detection was successful). Further, in a case where the object has not been successfully detected by the object detection module 123 (i.e., when the object detection was failed), if the object area has been identified in the zone AF scan processing, the CPU 115 sets AF frames in the identified object area. Further, if no object area can be identified, the CPU 115 sets AF frames in a predetermined area in the imaging screen. In the present exemplary embodiment, the predetermined area is, for example, one frame in the central area of the screen or any other area where the object is possibly present.

In step S313, the AF processing unit 105 causes the focus lens 104 to move to the in-focus position in the last time reference AF scan processing performed in step S304 if the determination result in step S306 is YES. Further, the AF processing unit 105 drives the focus lens 104 to the in-focus position obtained in the zone AF scan processing in a case where the determination result in step S303 is NO or the determination result in step S306 is NO. If a defocus state is confirmed, the AF processing unit 105 drives the focus lens 104 to a predetermined fixed point (e.g., a position where the object is probably present).

<Zone AF Scan Processing>

FIG. 5 is a flowchart illustrating the zone AF scan processing to be performed in step S307 illustrated in FIG. 3. In the present exemplary embodiment, the "zone" indicates each one of a plurality of ranges obtainable when a focusable distance range of the focus lens 104 is divided.

First, in step S501, the AF processing unit 105 causes the focus lens 104 to move to a scan start position. In the present exemplary embodiment, the scan start position is, for example, an infinite point position.

In step S502, the A/D conversion unit 109 converts an analog video signal read by the image sensor 108 into a digital signal. The image processing unit 110 extracts a high-frequency component of the luminance signal from the output of the A/D conversion unit 109. The CPU 115 stores the extracted high-frequency component as a focus evaluation value.

In step S503, the CPU 115 acquires information about the present position of the focus lens 104 and stores lens position data. In the present exemplary embodiment, the focus evaluation value is stored in association with the focus lens position.

In step S504, the CPU 115 checks the ON/OFF state of the switch SW1 that is operable to instruct a shooting preparation. If it is determined that the state of the switch SW1 is ON (Yes in step S504), the CPU 115 terminates the processing of the flowchart illustrated in FIG. 5. Then, the operation proceeds to step S208. If it is determined that the state of the switch SW1 is OFF (No in step S504), the operation proceeds to step S505.

In step S505, the CPU 115 performs scene change determination processing to determine whether the state of the shooting object and the state of the camera are instable and not suitable for shooting.

In step S506, the CPU 115 checks if the focus lens 104 is positioned on a zone boundary having been set beforehand. If the determination result is affirmative (Yes in step S506), the operation proceeds to step S507. Otherwise (No in step S506), the operation proceeds to step S509.

In step S507, the CPU 115 performs zone update determination processing according to a procedure described below. In the present exemplary embodiment, the "zone update" indicates updating the scan range continuously to a neighboring zone after completing the scan of one zone.

In step S508, the CPU 115 determines whether to perform zone update as a result determined in step S507. If the determination result is affirmative (Yes in step S508), the operation proceeds to step S509. Otherwise (No in step S508), the operation proceeds to step S511.

In step S509, the CPU 115 checks if the present position of the focus lens 104 is equal to a scan termination position. If it is determined that the present focus lens position is the scan termination position (Yes in step S509), the operation proceeds to step S511. Otherwise (No in step S509), the operation proceeds to step S510.

In step S510, the AF processing unit 105 causes the focus lens 104 to move in a scan termination direction by a predetermined amount. Then, the operation returns to step S502.

In step S511, the CPU 115 determines a scan result in each AF frame, which is selected from the following three determination results "○", "×" and "Δ." The scan result is determined as "○" if the contrast of the object is sufficient and the object is present within the scanned distance range. The scan result is determined as "×" if the contrast of the object is insufficient or if the object is positioned outside the scanned distance range. The scan result is determined as "Δ" if the object is positioned outside the scanned distance range in a near side direction.

An in-focus determination method is, for example, discussed in Japanese Patent No. 04235422 or in Japanese Patent No. 04185740.

In step S512, the CPU 115 checks if the object has been successfully detected by the object detection module 123. If it is determined that the object has been successfully detected (Yes in step S512), the operation proceeds to step S513. If it is determined that the object detection is failed (No in step S512), the operation proceeds to step S514. In step S513, the CPU 115 performs frame selection processing responding to a successful object detection as described below.

In step S514, the CPU 115 performs frame selection processing responding to a failed object detection as described below.

<Zone Update Determination Processing>

Figure 6B:
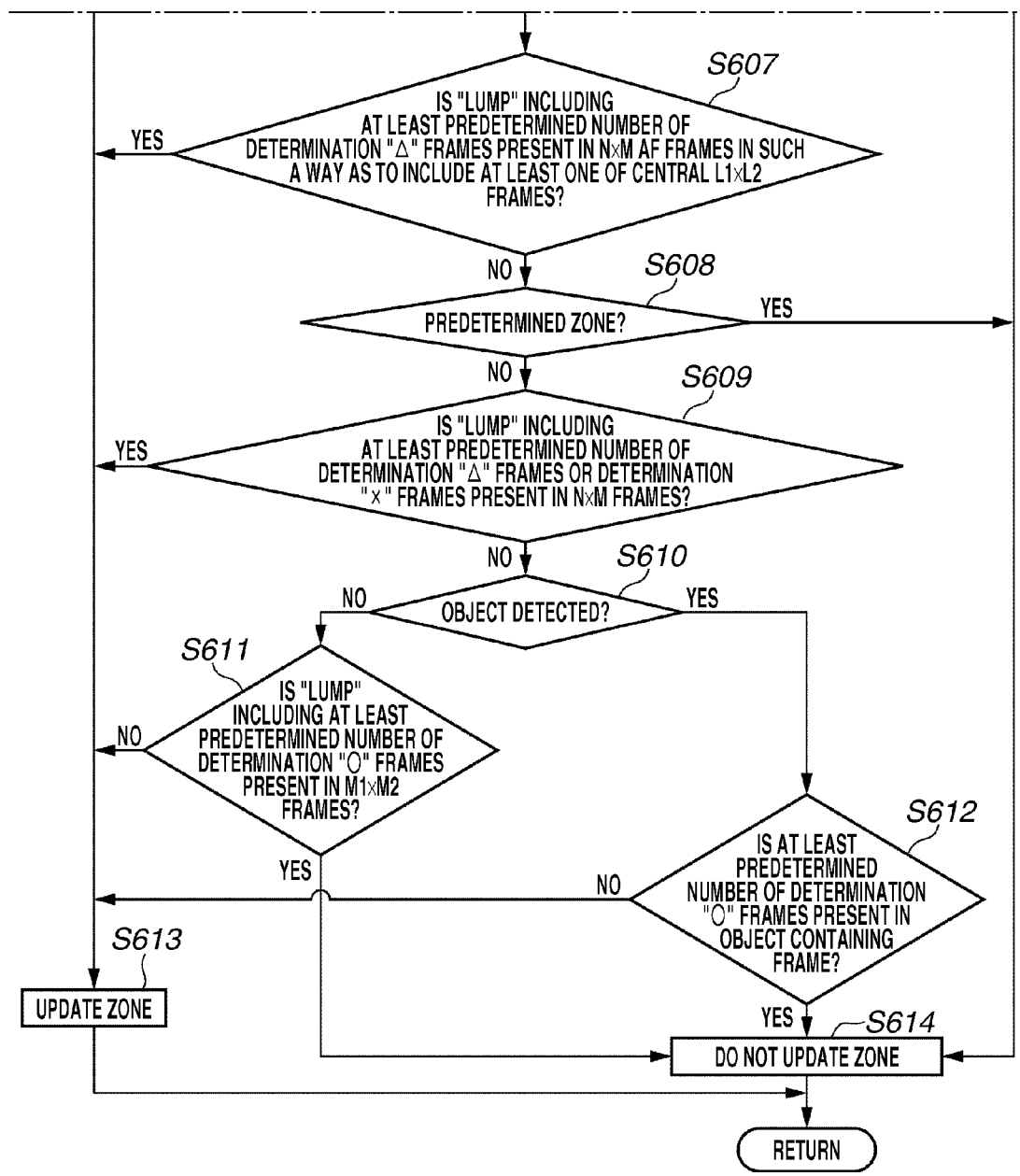

FIG. 6A-6B is a flowchart illustrating the zone update determination processing to be performed in step S507 illustrated in FIG. 5. In the present exemplary embodiment, the CPU 115 determines whether the object is present in a scan direction. More specifically, the CPU 115 determines whether to continue the AF scan processing. FIGS. 7A to 7G illustrate examples of the zone update determination illustrated in FIG. 6A-6B, which have been obtained when N=7 and M=9.

Figure 7A:
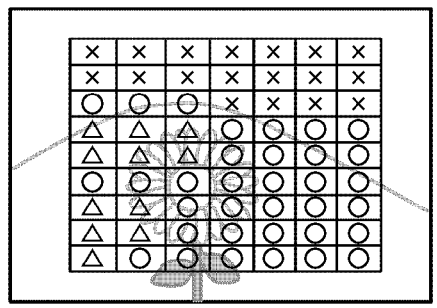
FIGS. 7A to 7G illustrate the zone update determination processing illustrated in FIG. 5.
Figure 7B:
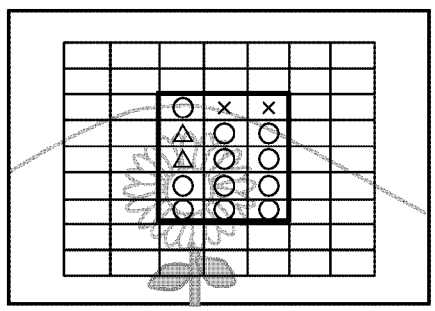
Figure 7C:
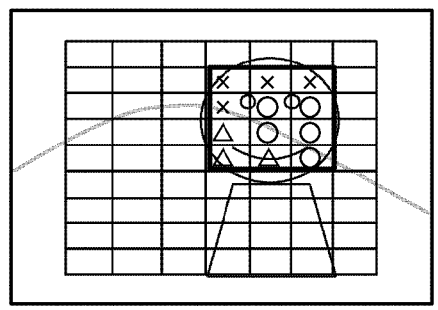
Figure 7D:
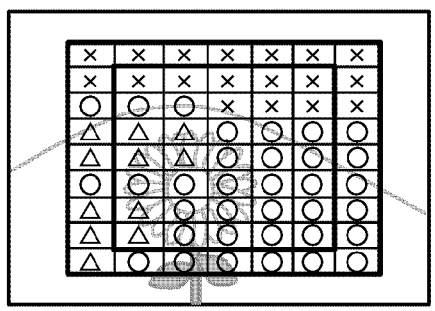
Figure 7E:
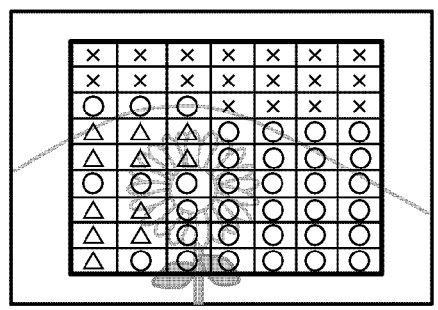
Figure 7F:
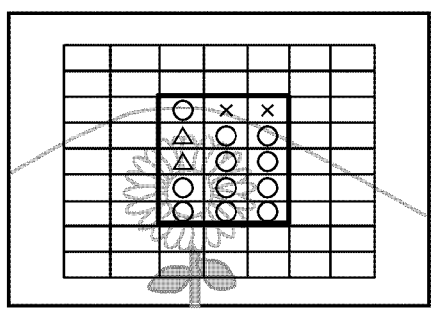
Figure 7G:
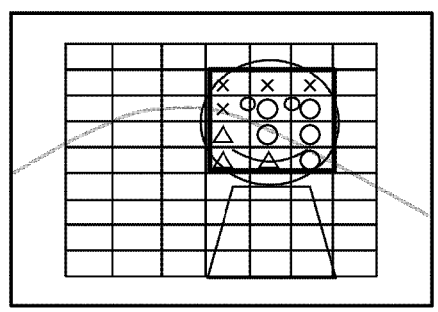

First, in step S601, the CPU 115 performs in-focus determination processing in each of the AF frames having been set. For example, in-focus determination results can be obtained in respective AF frames as illustrated in FIG. 7A.

In step S602, the CPU 115 checks if the scan processing has been thoroughly completed for all (i.e., from the first to the last) zones. If it is determined that the scan processing for the last zone is already completed (Yes in step S602), the operation proceeds to step S614. Otherwise (No in step S602), the operation proceeds to step S603.

In step S603, the CPU 115 checks if the determination "○" frame is present. If it is determined that the determination "○" frame is present (Yes in step S603), the operation proceeds to step S604. Otherwise (No in step S603), the operation proceeds to step S613.

In step S604, the CPU 115 checks if the object has been successfully detected by the object detection module 123. If it is determined that the object has been successfully detected (Yes in step S604), the operation proceeds to step S606. Otherwise (No in step S604), the operation proceeds to step S605.

In step S605, the CPU 115 checks if a "group" including at least a predetermined number of determination "Δ" frames is present in a central M1×M2 frames. If the determination result is affirmative (Yes in step S605), the operation proceeds to step S613. Otherwise (No in step S605), the operation proceeds to step S607. In the example illustrated in FIG. 7B (i.e., M1=3 and M2=5), a group of determination "Δ" frames is composed of only two frames. Therefore, if the predetermined number is set to 5, there is not any group that includes at least the predetermined number of determination "Δ" frames.

In step S606, the CPU 115 checks if the number of determination "Δ" frames in the AF frames including an object detection area is equal to or greater than a predetermined number. If it is determined that the number of determination "Δ" frames is equal to or greater than the predetermined number (Yes in step S606), the operation proceeds to step S613. If it is determined that the number of determination "Δ" frames is less than the predetermined number (No in step S606), the operation proceeds to step S607.

In the present exemplary embodiment, if an AF frame includes at least a predetermined rate of the object detection area, the AF frame is selected as a part of the AF frames including the object detection area. In the example illustrated in FIG. 7C, a group of determination "Δ" frames is composed of only three frames. Therefore, if the predetermined number is set to 5, there is not any group that includes at least the predetermined number of determination "Δ" frames.

In step S607, the CPU 115 checks if a "group" including at least a predetermined number of determination "Δ" frames is present in the N×M AF frames in such a way as to include at least one of central L1×L2 frames. If the determination result is affirmative (Yes in step S607), the operation proceeds to step S613. Otherwise (No in step S607), the operation proceeds to step S608. In the example illustrated in FIG. 7D (i.e., L1=5 and L1=7), a group of determination "Δ" frames is composed of six frames. Therefore, if the predetermined number is set to 10, there is not any group that includes at least the predetermined number of determination "Δ" frames.

In step S608, the CPU 115 checks if the processing target is a predetermined zone having been determined beforehand. If it is determined that the processing target is the predetermined zone (Yes in step S608), the operation proceeds to step S614. If it is determined that the predetermined zone is not yet processed (No in step S608), the operation proceeds to step S609.

In the present exemplary embodiment, the predetermined zone is a zone where a determination "Δ" frame is possibly present when the scan position shifts to a peak position where the object is present with increasing evaluation value in a case where the object is present at the nearest position in a scan feasible range. If no group of determination "Δ" frames can be detected even when the scan position reaches the predetermined zone, it is believed that the object is not present in succeeding zones.

In step S609, the CPU 115 checks if a "group" including at least a predetermined number of determination "Δ" frames or determination "×" frames is present in the N×M frames. If the determination result is affirmative (Yes in step S609), the operation proceeds to step S613. Otherwise (No in step S609), the operation proceeds to step S610. In the example illustrated in FIG. 7E, a group of determination "×" frames is composed of 18 frames and a group of determination "Δ" frames is composed of six (or four) frames. Therefore, if the predetermined number is set to 20, there is not any group that includes at least the predetermined number of determination "Δ" frames or determination "×" frames.

In step S610, the CPU 115 checks if the object has been successfully detected by the object detection module 123. If it is determined that the object has been successfully detected (Yes in step S610), the operation proceeds to step S612. Otherwise (No in step S610), the operation proceeds to step S611.

In step S611, the CPU 115 checks if a "group" including at least a predetermined number of determination "○" frames is present in the central M1×M2 frames. If the determination result is affirmative (Yes in step S611), the operation proceeds to step S614. Otherwise (No in step S611), the operation proceeds to step S613. In the example illustrated in FIG. 7F, a group of determination "○" frames is composed of 10 frames. Therefore, if the predetermined number is set to 10, the group that includes at least the predetermined number of determination "○" frames is present.

In step S612, the CPU 115 checks if at least a predetermined number of determination "○" frames is present in the AF frames including the object detection area. If the determination result is affirmative (Yes in step S612), the operation proceeds to step S614. Otherwise (No in step S612), the operation proceeds to step S613. In the example illustrated in FIG. 7G, a group of determination "○" frames is composed of five frames. Therefore, if the predetermined number is set to 5, the group that includes at least the predetermined number of determination "○" frames is present.

In step S613, the CPU 115 determines to update the zone and terminates the determination processing of the flowchart illustrated in FIG. 6A-6B. In step S614, the CPU 115 determines not to update the zone and terminates the determination processing of the flowchart illustrated in FIG. 6A-6B.

The predetermined number in each of step S605, step S606, step S607, step S609, step S611, and step S612 is a fixed value that can be uniformly determined. However, the predetermined number can be changed arbitrarily with reference to the zone range or the position of the focus lens 104. For example, it is feasible to set a larger number when the object is positioned on the near side.

<Frame Selection Processing Responding To Successful Object Detection>

Figure 8B:
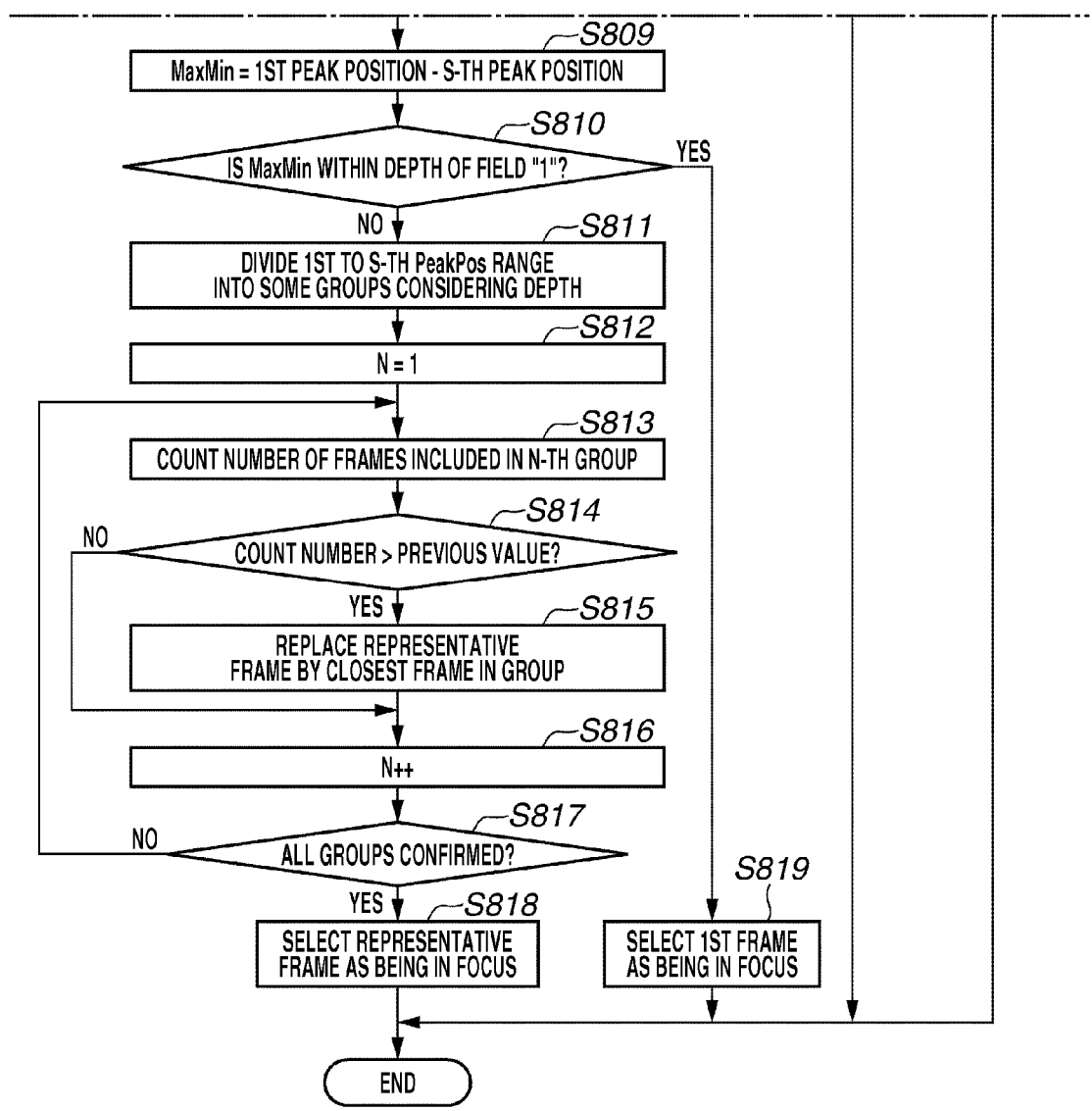

FIG. 8A-8B is a flowchart illustrating the frame selection processing to be performed in response to the successful object detection in step S513 illustrated in FIG. 5. The frame selection processing responding to the successful object detection includes selecting frames from AF frames including the object area.

First, in step S801, the CPU 115 determines a target frame to be selected from the detected AF frames including the object area. The target frame includes each determination "○" frame identified as a result of the in-focus determination processing performed in step S511 illustrated in FIG. 5.

In step S802, the CPU 115 calculates a peak position (hereinafter, referred to as PeakPos) of the focus evaluation value in the target frame and stores the calculated peak position PeakPos.

In step S803, the CPU 115 sorts the PeakPos of each AF frame in the target frame in order of closeness and sets a sort number S.

In step S804, the CPU 115 checks if the sort number S is equal to or greater than 1. If the relationship that the sort number S is equal to or greater than 1 is confirmed (Yes in step S804), the operation proceeds to step S805. Otherwise (No in step S804), the operation proceeds to step S821.

In step S805, the CPU 115 sets a counter value P to 1. The counter value P indicates the order of closeness with respect to the peak position in the target frame calculated in step S802.

In step S806, the CPU 115 checks if a difference between the P-th PeakPos and the (P+1)th PeakPos, in the sort order, is within the depth of field and the P-th frame and the (P+1)th frame are positioned closely in the imaging screen. If the determination result is affirmative (Yes in step S806), the operation proceeds to step S820. Otherwise (No in step S806), the operation proceeds to step S807.

In step S807, the CPU 115 increments the counter value P by one.

In step S808, the CPU 115 checks if the counter value P is greater than the sort number S. If the relationship that the counter value P is greater than the sort number S is confirmed (Yes in step S808), the operation proceeds to step S809. Otherwise (No in step S808), the operation returns to step S806.

In step S809, the CPU 115 calculates a difference between the first PeakPos and the S-th PeakPos and stores the calculated difference as MaxMin.

In step S810, the CPU 115 checks if the MaxMin calculated in step S809 is within the depth of field "1." If it is determined that the MaxMin is within the depth of field "1" (Yes in step S810), the operation proceeds to step S819. If it is determined that the MaxMin is not within the depth of field "1" (No in step S810), the operation proceeds to step S811.

In step S811, the CPU 115 divides the region ranging from the 1st PeakPos to the S-th PeakPos into a plurality of groups considering the depth of field. In step S812, the CPU 115 sets a counter value N to 1. The counter value N indicates each group in order of closeness.

In step S813, the CPU 115 counts the number of AF frames included in the N-th group.

In step S814, the CPU 115 checks if the count number counted in step S813 is greater than the count number of the (N-1)th group. If it is determined that the present count number is greater than the previous value (Yes in step S814), the operation proceeds to step S815. If it is determined that the present count number is not greater than the previous value (No in step S814), the operation proceeds to step S816.

In step S815, the CPU 115 replaces a representative frame by a closest frame in the group.

In step S816, the CPU 115 increments the counter value N by one.

In step S817, the CPU 115 checks if confirmation about all groups has been completed. If it is determined that the confirmation about all groups has been completed (Yes in step S817), the operation proceeds to step S818. If it is determined that the confirmation about all groups is not yet completed (No in step S817), the operation returns to step S813.

In step S818, the CPU 115 selects the representative frame as being in focus. In step S819, the CPU 115 selects the first frame as being in focus. In step S820, the CPU 115 selects the P-th frame as being in focus. In step S821, the CPU 115 does not select any frame because of defocus and terminates the processing of the flowchart illustrated in FIG. 8A-8B.

<Frame Selection Processing Responding to Failed Object Detection>

Figure 9:
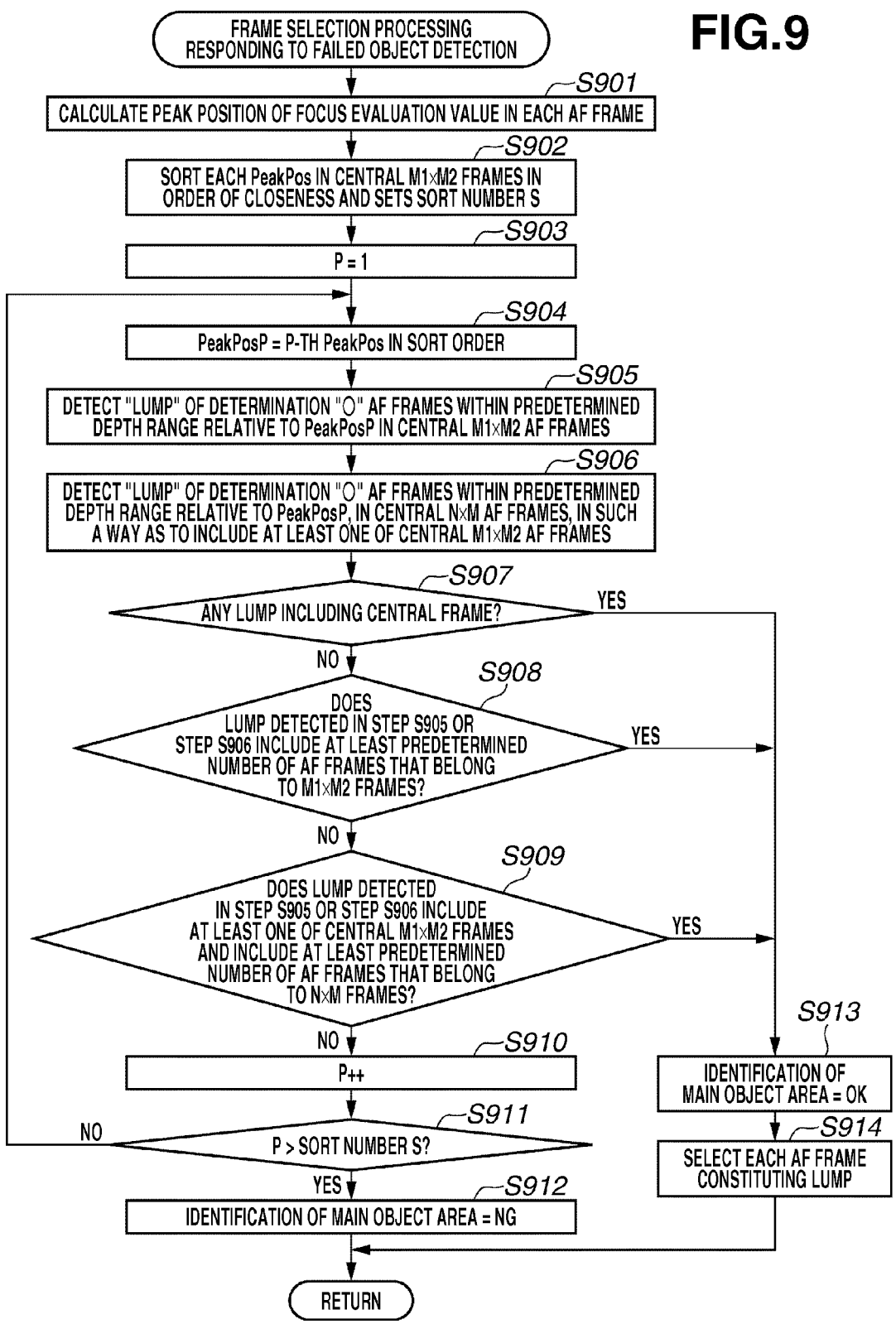
FIG. 9 is a flowchart illustrating frame selection processing responding to failed object detection illustrated in FIG. 5.

FIG. 9 is a flowchart illustrating the frame selection processing to be performed in step S514 illustrated in FIG. 5. The frame selection processing responding to the failed object detection includes identifying a main object area in the imaging screen and performing frame selection processing within the identified area.

FIGS. 10A to 10C illustrate an example of the frame selection processing responding to the failed object detection illustrated in FIG. 9. According to the illustrated AF frame setting of N×N frames (i.e., N=7 and M=9), the scan range is set to 0 to 300 and a predetermined depth range is set to ±10. Further, FIG. 10A illustrates in-focus determination results in respective AF frames, which can be obtained through the in-focus determination processing performed in step S511 illustrated in FIG. 5. Numerical values of the scan range and the predetermined depth range represent the position of the focus lens 104. In a case where a driving motor (not illustrated) of the focus lens 104 is a stepping motor, the position of the focus lens 104 corresponds to a pulse number of the stepping motor. A larger value indicates a nearer side position.

First, in step S901, the CPU 115 calculates a peak position (hereinafter, referred to as PeakPos) of the focus evaluation value in each AF frame and stores the calculated peak position PeakPos. FIG. 10B illustrates peak position calculation results in respective AF frames. In step S902, the CPU 115 sorts the PeakPos of each AF frame in the central M1×M2 frames in order of closeness and sets a sort number S. As illustrated in FIG. 10B, in the following example (M1=3 and M2=5), fifteen frames surrounded by a bold line (i.e., five frames arrayed in the vertical direction×three frames arrayed in the horizontal direction) is set in the central region.

In the present exemplary embodiment, the CPU 115 cannot calculate the peak position in each "×" AF frame determined in the in-focus determination processing performed in step S511 illustrated in FIG. 5. Therefore, the determination "×" AF frame is not the target to be sorted. For example, 202, 202, 201, 201, 201, 200, 200, 200, 103, 103, 102, 102, and 101 are sorted in order of closeness when the CPU 115 processes the example illustrated in FIG. 10B. The sort number S=13 is set.

In step S903, the CPU 115 sets the counter value P to 1. The counter value P indicates the order of closeness with respect to the peak position in the M1×M2 frames calculated in step S902.

In step S904, the CPU 115 sets the P-th PeakPos as PeakPosP. For example, PeakPosP=202 if P=1 according to the example illustrated in FIG. 10B.

In step S905, the CPU 115 detects a "group" of determination "○" AF frames within a predetermined depth of field from the peak position PeakPosP in the central M1×M2 AF frames and stores the number of AF frames constituting the "group" together with the position of each AF frame. In the present exemplary embodiment, the "group" indicates a group of a plurality of AF frames each satisfying the condition and neighboring in the up-and-down direction and in the right-and left direction. Further, if two or more "groups" are present, the CPU 115 can select one "group" with reference to the number of AF frames that constitute each "group" and the position of the "group."

In step S906, the CPU 115 detects a "group" of determination "○" AF frames within the predetermined depth range from the peak position PeakPosP, in the central N×M AF frames, in such a way as to include at least one of the central M1×M2 AF frames. The CPU 115 stores the number of AF frames that constitute the "group" together with the position of each AF frame. For example, FIG. 10C illustrates a "group" of gray frames that has been detected based on determination results illustrated in FIGS. 10A and 10B.

In step S907, the CPU 115 checks if the "group" detected in step S905 or step S906 includes a central frame. If it is determined that the "group" including the central frame is present (Yes in step S907), the operation proceeds to step S913. Otherwise (No in step S907), the operation proceeds to step S908.

In step S908, the CPU 115 checks if the "group" detected in step S905 or step S906 includes at least a predetermined number of frames that belong to the M1×M2 frames. If the determination result is affirmative (Yes in step S908), the operation proceeds to step S913. Otherwise (No in step S908), the operation proceeds to step S909.

In step S909, the CPU 115 checks if the "group" detected in step S905 or step S906 includes at least one of the central M1×M2 frames and includes at least a predetermined number of AF frames that belong to the N×M frames. If it is determined that the detected "group" includes at least one of the central M1×M2 frames and includes at least the predetermined number of AF frames that belong to the N×M frames (Yes in step S909), the operation proceeds to step S913. Otherwise (No in step S909), the operation proceeds to step S910.

In step S910, the CPU 115 increments the counter value P by one.

In step S911, the CPU 115 checks if the counter value P is greater than the sort number S. If the relationship that the counter value P is greater than the sort number S is confirmed (Yes in step S911), the operation proceeds to step S912. Otherwise (No in step S911), the operation returns to step S904.

In step S912, the CPU 115 determines that the main object area has not been identified and terminates the determination processing of the flowchart illustrated in FIG. 9.

In step S913, the CPU 115 determines that the main object area has been identified.

In step S914, the CPU 115 determines that each AF frame constituting the group as a part of the main object area and selects the determined AF frame. Then, the CPU 115 terminates the determination processing of the flowchart illustrated in FIG. 9.

The predetermined number in each of step S908 and step S909 is a fixed value that can be uniformly determined irrespective of the position. However, the predetermined number can be changed arbitrarily with reference to the position of the focus lens 104. For example, it is feasible to set a larger number when the object is positioned on the nearer side.

<Equidistance Determination Processing>

Figure 11:
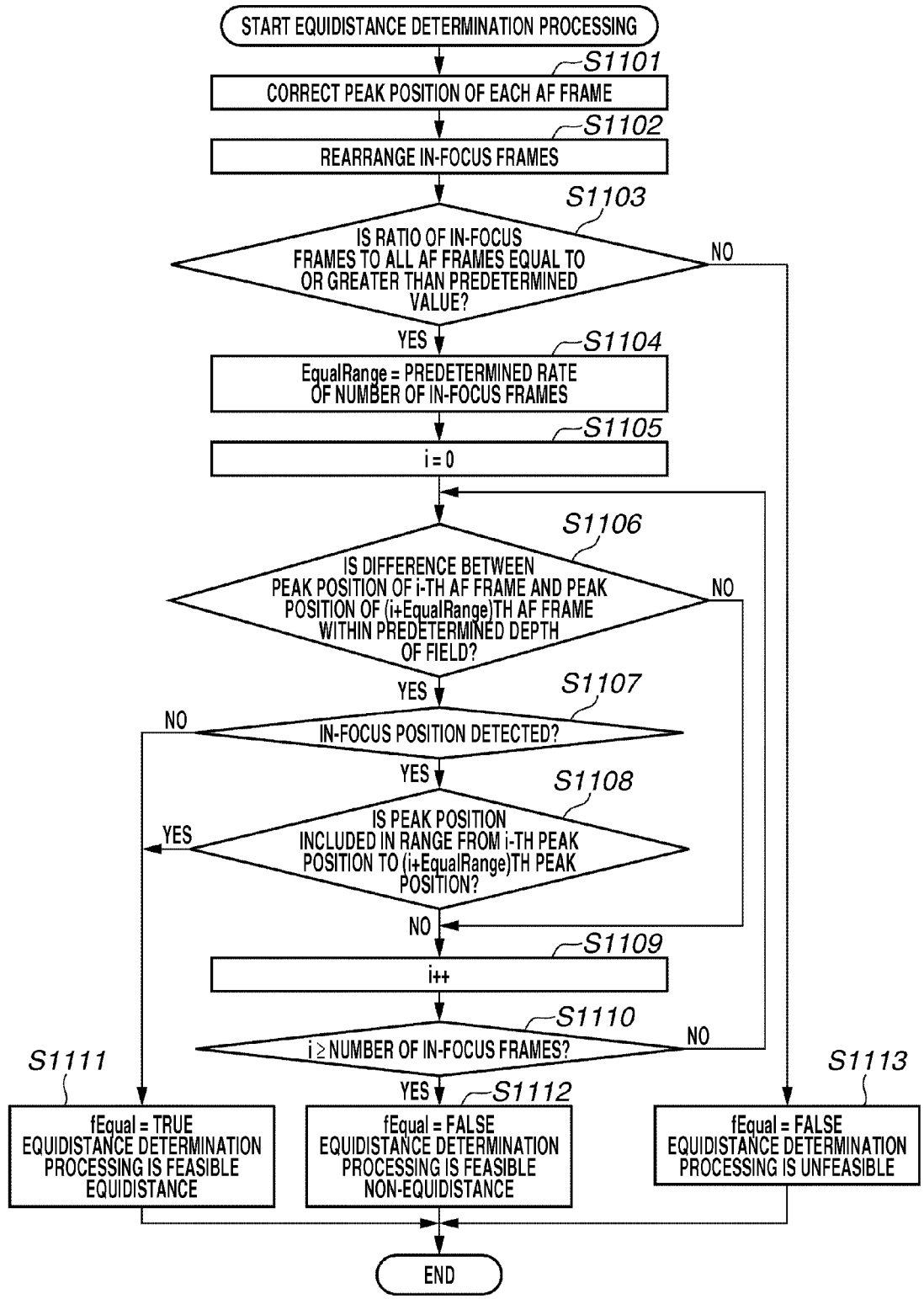
FIG. 11 is a flowchart illustrating equidistance determination processing illustrated in FIG. 3.

FIG. 11 is a flowchart illustrating the equidistance determination processing to be performed in step S305 and step S308 illustrated in FIG. 3. The equidistance determination processing includes identifying an equidistance scene which includes no distance difference in the imaging screen with reference to a distribution of peak positions of respective AF frames.

In step S1101, the CPU 115 corrects the peak position of each AF frame based on an error amount acquired beforehand with respect to the peak position of each AF frame. The correction is necessary to eliminate the influence of an error in the distribution of peak positions that may be included due to curvature of field or inclination of lens/image sensor.

In step S1102, the CPU 115 rearranges the AF frames determined as being "○" in step S601 illustrated in FIG. 6A-6B in order of closeness with respect to the peak position.

In step S1103, the CPU 115 checks if the ratio of the number of determination "○" frames to the total number of AF frames is equal to or greater than a predetermined rate. If it is determined that the ratio is equal to or greater than the predetermined rate (Yes in step S1103), the operation proceeds to step S1104. If it is determined that the ratio is less than the predetermined rate (No in step S1103), the CPU 115 determines that the equidistance determination processing cannot be accurately performed because the number of determination "○" frames is insufficient. In this case, the operation proceeds to step S1113.

In step S1104, the CPU 115 sets the number of frames corresponding to the predetermined rate of the number of determination "○" frames, as an equidistance range (EqualRange).

In step S1105, the CPU 115 initializes a variable "i", which indicates a count number of determination "○" frames, to 0.

In step S1106, the CPU 115 checks if the difference between the peak position of the i-th AF frame and the peak position of the (i+EqualRange)th AF frame is within a predetermined depth of field. If it is determined that the difference is within the predetermined depth of field (Yes in S1106), the operation proceeds to step S1107. If it is determined that the difference is not within the predetermined depth of field (No in S1106), the operation proceeds to step S1109.

In step S1107, the CPU 115 checks if the in-focus position has been detected in the last scan processing (step S304 or step S307 in FIG. 3). If it is determined that the in-focus position has been detected (Yes in step S1107), the operation proceeds to step S1108. Otherwise (No in step S1107), the operation proceeds to step S1111.

In step S1108, the CPU 115 checks if the in-focus position is included in a range from the peak position of the i-th AF frame to the peak position of the (i+EqualRange)th AF frame. If it is determined that the in-focus position is included in the range (Yes in step S1108), the operation proceeds to step S1111. Otherwise (No in step S1108), the operation proceeds to step S1109.

In step S1109, the CPU 115 increments the variable "i" by one. Then, the operation proceeds to step S1110.

In step S1110, the CPU 115 checks if the variable is equal to or greater than the total number of determination "○" frames. If it is determined that the variable "i" is equal to or greater than the total number of determination "○" frames (Yes in step S1110), the CPU 115 determines that all of the determination "○" frames has been subjected to the above-mentioned determination processing. In this case, the operation proceeds to step S1112. If it is determined that the variable "i" is less than the total number of determination "○" frames (No in step S1110), the operation returns to step S1106 to continue the above-mentioned determination processing.

In step S1111, the CPU 115 determines that the equidistance determination processing is feasible and the scene is an equidistance scene. In step S1112, the CPU 115 determines that the equidistance determination processing is feasible and recognizes the presence of a distance difference in the scene. In step S1113, the CPU 115 determines that the equidistance determination processing is unfeasible and terminates the equidistance determination processing of the flowchart illustrated in FIG. 11.

<Continuous AF processing>

Figure 12:
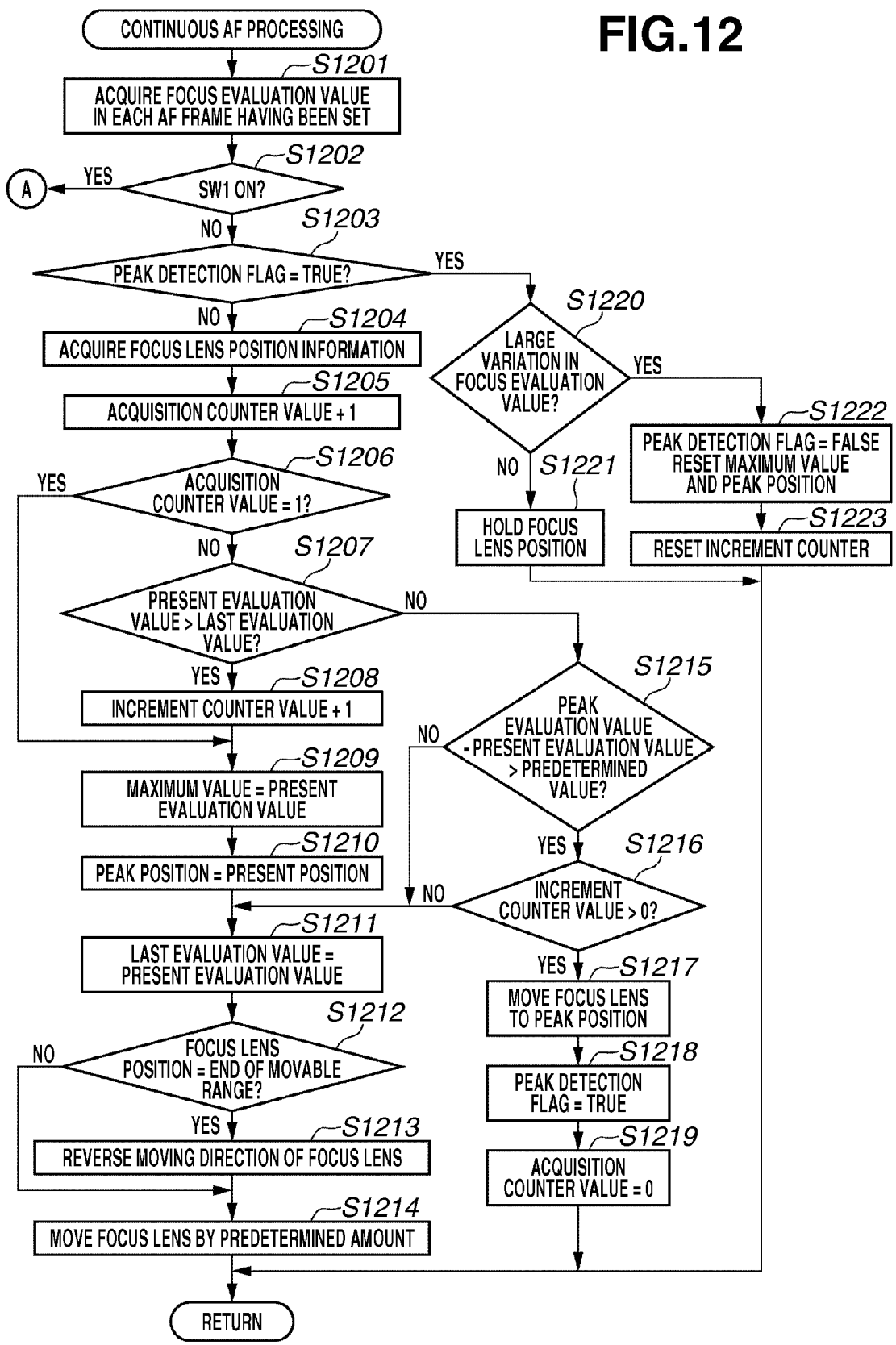
FIG. 12 is a flowchart illustrating continuous AF processing illustrated in FIG. 2.

FIG. 12 is a flowchart illustrating the continuous AF processing to be performed in step S205 illustrated in FIG. 2.

In step S1201, the CPU 115 acquires the focus evaluation value in each AF frame having been set for the in-focus control in the continuous AF processing. In the present exemplary embodiment, the AF frames having been set for the in-focus control in the continuous AF processing are the frames having been set in the object detection area (i.e., the frames selected in step S513 illustrated in FIG. 5) when the object detection is successfully completed or the frames selected as in-focus frames in step S514 illustrated in FIG. 5 when the object detection fails.

In step S1202, the CPU 115 checks the ON/OFF state of the switch SW1 that instructs a shooting preparation. If it is determined that the state of the switch SW1 is ON (Yes in step S1202), the CPU 115 terminates the processing of the flowchart illustrated in FIG. 12 and the operation proceeds to step S208 illustrated in FIG. 2. If it is determined that the state of the switch SW1 is OFF (No in step S1202), the operation proceeds to step S1203.

In step S1203, the CPU 115 checks if a peak detection flag is TRUE. If it is determined that the peak detection flag is TRUE (Yes in step S1203), the operation proceeds to step S1220. If it is determined that the peak detection flag is FALSE (No in step S1203), the operation proceeds to step S1204. In the present exemplary embodiment, the peak detection flag is initially set to FALSE.

In step S1204, the CPU 115 acquires information about the present position of the focus lens 104.

In step S1205, the CPU 115 adds 1 to an acquisition counter value. In the present exemplary embodiment, the acquisition counter is used in acquisition of the focus evaluation value and acquisition of the information about the present position of the focus lens 104. The acquisition counter value is initially set to 0 through a predetermined initialization operation (not illustrated).

In step S1206, the CPU 115 checks if the acquisition counter value is 1. If it is determined that the acquisition counter value is 1 (Yes in step S1206), the operation proceeds to step S1209. If it is determined that the acquisition counter value is not 1 (No in step S1206), the operation proceeds to step S1207.

In step S1207, the CPU 115 checks if the "present focus evaluation value" is greater than the "last focus evaluation value." If the determination result is affirmative (Yes in step S1207), the operation proceeds to step S1208. Otherwise (No in step S1207), the operation proceeds to step S1215.

In step S1208, the CPU 115 adds 1 to an increment counter value.

In step S1209, the CPU 115 stores the present focus evaluation value, as the maximum focus evaluation value, in an arithmetic memory (not illustrated) provided in the CPU 115.

In step S1210, the CPU 115 stores the present position of the focus lens 104, as the peak position of the focus evaluation value, in the arithmetic memory (not illustrated) provided in the CPU 115.

In step S1211, the CPU 115 stores the present focus evaluation value, as the last focus evaluation value, in the arithmetic memory (not illustrated) provided in the CPU 115.

In step S1212, the CPU 115 checks if the present position of the focus lens 104 is an end of a focus lens movable range. If the determination result is affirmative (Yes in step S1212), the operation proceeds to step S1213. Otherwise (No in step S1212), the operation proceeds to step S1214.

In step S1213, the AF processing unit 105 causes the focus lens 104 to reverse its moving direction.

In step S1214, the AF processing unit 105 causes the focus lens 104 to move by a predetermined amount.

In step S1215, the CPU 115 checks if "the maximum focus evaluation value—the present focus evaluation value" is greater than a predetermined amount. If it is determined that "the maximum focus evaluation value—the present focus evaluation value" is greater than the predetermined amount (Yes in step S1215), the operation proceeds to step S1216. Otherwise (No in step S1215), the operation proceeds to step S1211. In the case where "the maximum focus evaluation value the present focus evaluation value" is greater than the predetermined amount, namely when there is a predetermined amount of reduction compared to the maximum value, the CPU 115 regards the maximum value as a focus peak position.

In step S1216, the CPU 115 checks if the increment counter value is greater than 0. If it is determined that the increment counter value is greater than 0 (Yes in step S1216), the operation proceeds to step S1217. If it is determined that the increment counter value is not greater than 0 (No in step S1216), the operation proceeds to step S1211.

In step S1217, the AF processing unit 105 causes the focus lens 104 to move to the peak position stored in step S1210, at which the focus evaluation value is maximized.

In step S1218, the CPU 115 sets the peak detection flag to TRUE.

In step S1219, the CPU 115 sets the acquisition counter value to 0.

In step S1220, the CPU 115 checks if the variation of the present focus evaluation value relative to the maximum focus evaluation value is equal to or greater than a predetermined rate. If it is determined that the variation is equal to or greater than the predetermined rate (Yes in step S1220), the operation proceeds to step S1222. Otherwise (No in step S1220), the operation proceeds to step S1221.

In step S1221, the AF processing unit 105 holds the position of the focus lens 104.

In step S1222, the CPU 115 sets the peak detection flag to FALSE to reacquire the focus lens position where the focus evaluation value is maximized. Further, the CPU 115 resets the maximum focus evaluation value and the peak position.

In step S1223, the CPU 115 resets the increment counter.

As mentioned above, the focus lens can be driven in such a way as to bring the main object into an in-focus state constantly in a continuous AF operation.

<Bracket Determination Processing>

Figure 13:
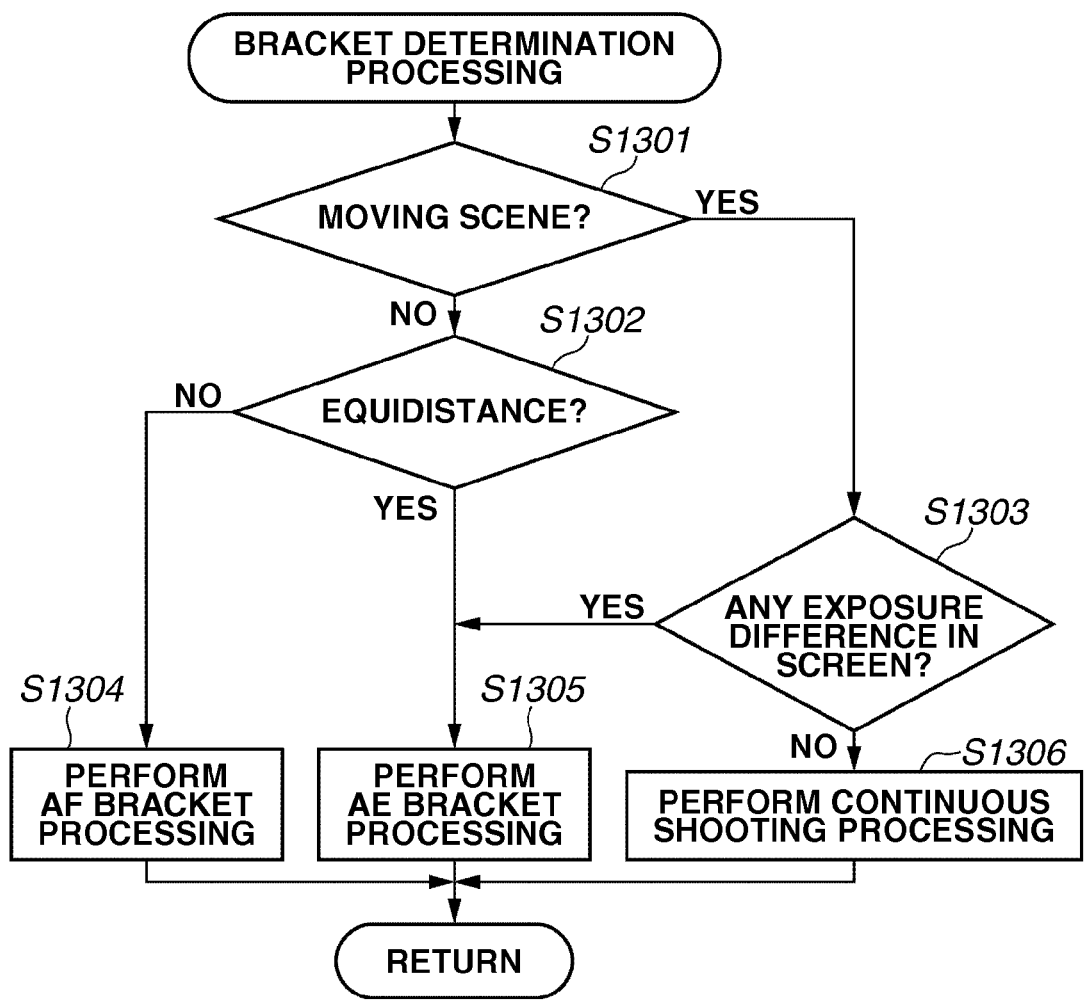
FIG. 13 is a flowchart illustrating bracket determination processing illustrated in FIG. 2.

FIG. 13 is a flowchart illustrating the bracket determination processing to be performed in step S208 illustrated in FIG. 2. The bracket determination processing includes determining optimum processing to be selected when a shooting operation is performed, with reference to information obtained before the switch SW1 is turned on.

In step S1301, the CPU 115 determines whether the scene includes a moving substance (e.g., the camera or the object) with reference to output results of the angular speed sensor unit 125 and the moving body detection unit 124 obtained immediately before the switch SW1 is turned on. If it is determined that the scene includes any moving substance (Yes in step S1301), the operation proceeds to step S1303. Otherwise (No in step S1301), the operation proceeds to step S1302.

In step S1302, the CPU 115 checks if the scene has been determined as an equidistance scene in the equidistance determination processing performed in step S305 or step S308 illustrated in FIG. 3 immediately before the switch SW1 is turned on. If the determination result is affirmative (Yes in step S1302), the operation proceeds to step S1305. Otherwise (No in step S1302), the operation proceeds to step S1304.

In step S1303, the CPU 115 checks if the scene includes any exposure difference in the imaging screen based on an exposure distribution in the imaging screen that has been acquired by the AE processing unit 103 immediately before the switch SW1 is turned on. If it is determined that the scene includes any exposure difference in the imaging screen (Yes in step S1303), the operation proceeds to step S1305. Otherwise (No in step S1303), the operation proceeds to step S1306.

In step S1304, the CPU 115 selects AF bracket processing, as processing to be performed when a shooting operation is performed, and terminates the processing of the flowchart illustrated in FIG. 13.

In step S1305, the CPU 115 selects AE bracket processing, as processing to be performed when a shooting operation is performed, and terminates the processing of the flowchart illustrated in FIG. 13.

In step S1306, the CPU 115 selects continuous shooting processing, as processing to be performed when a shooting operation is performed, and terminates the processing of the flowchart illustrated in FIG. 13.

<Main Exposure AF Scan Processing>

Figure 14:
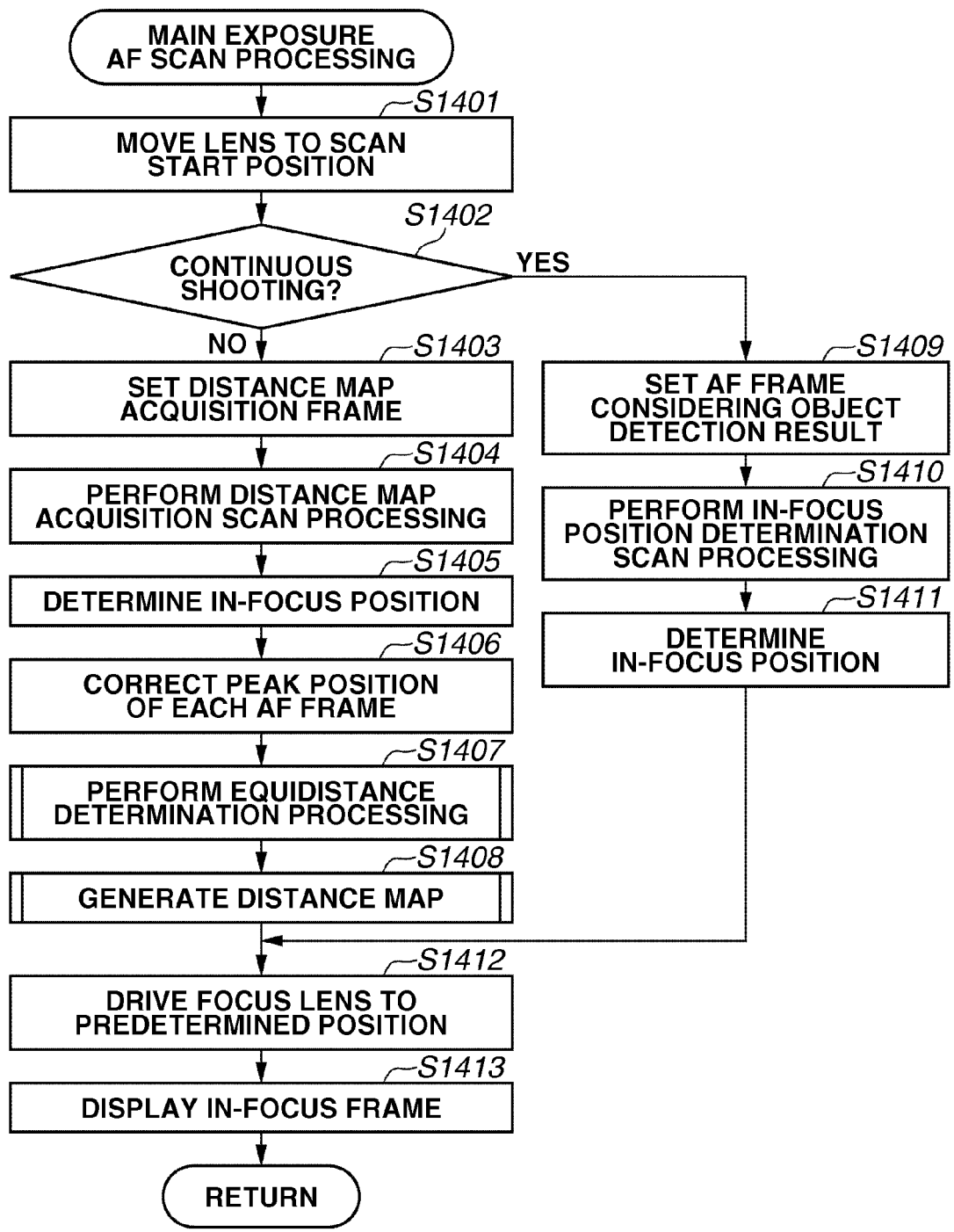
FIG. 14 is a flowchart illustrating main exposure AF scan processing illustrated in FIG. 2.

FIG. 14 is a flowchart illustrating the main exposure AF scan processing to be performed in step S210 illustrated in FIG. 2. The main exposure AF scan processing includes acquiring distance information to generate a grouping result (hereinafter, referred to as a distance map) that reflects a distance distribution in the imaging screen and to perform equidistance determination to determine whether to identify a scene including a distance difference in the imaging screen, and performing AF scan processing to determine an in-focus position.

First, in step S1401, the AF processing unit 105 causes the focus lens 104 to move to the scan start position. In the present exemplary embodiment, the scan start position is set on the far side of an AF scan executable range (e.g., an infinite point).

In step S1402, the CPU 115 determines whether to perform continuous shooting as a result in the bracket determination processing performed in step S208 illustrated in FIG. 2. If it is determined to perform the continuous shooting processing (Yes in step S1402), the operation proceeds to step S1409. If it is determined to perform the AF bracket or AE bracket processing (No in step S1402), the operation proceeds to step S1403.

Figure 15A:
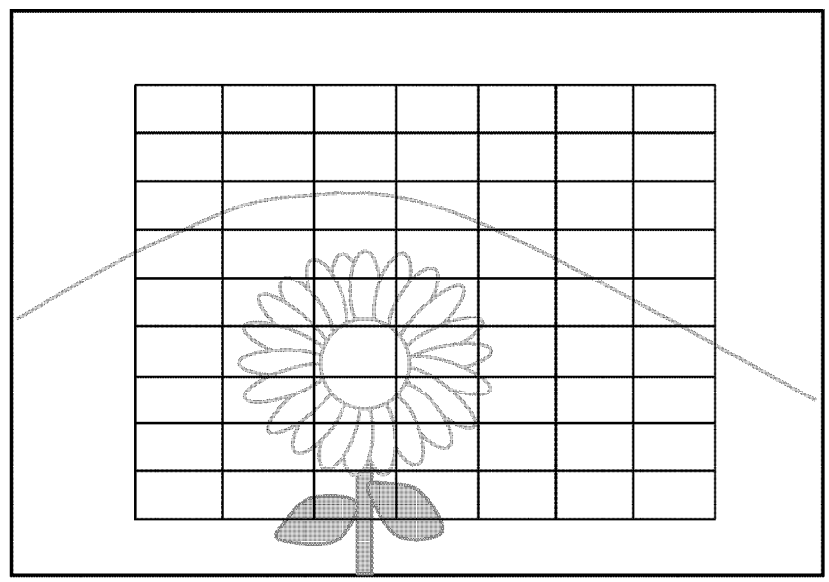
FIGS. 15A and 15B illustrate distance map generation illustrated in FIG. 14.

In step S1403, the CPU 115 sets an AM frame region composed of N×M frames to acquire the distance map. For example, FIG. 15A illustrates an example of the AM frame region that can be set when N=7 and M=9.

In step S1404, the CPU 115 performs AF scan processing to detect a peak position in each of the AF frames having been set to acquire the distance map in step S1403.

In step S1405, the CPU 115 determines an in-focus position based on the peak position in each AF frame obtained in the scan processing performed in step S1404.

In step S1406, the CPU 115 corrects the peak position of each AF frame based on an error amount acquired beforehand with respect to the peak position, to eliminate the influence of an error in the distribution of peak positions that may be included due to curvature of field or inclination of lens/image sensor.

In step S1407, the CPU 115 performs equidistance determination processing for the peak position of each AF frame corrected in step S1406.

Figure 15B:
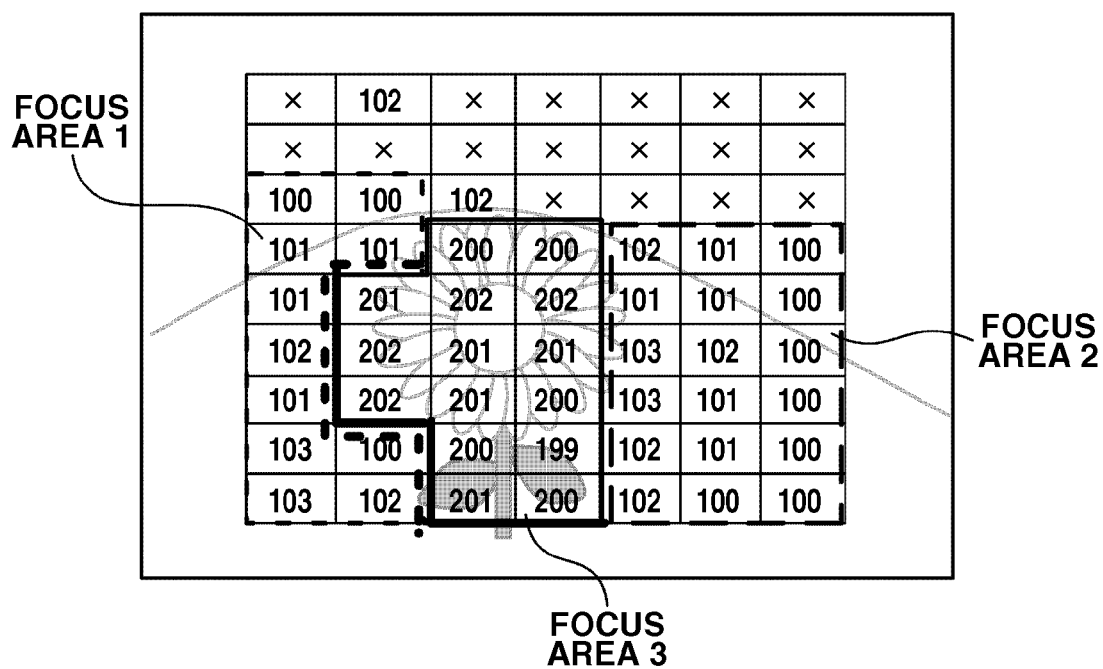

In step S1408, the CPU 115 generates a distance map with reference to the distribution of peak positions of respective AF frames corrected in step S1406. FIG. 15B illustrates peak positions of respective AF frames obtained when a captured image includes a flower on the near side and a mountain on the far side. The peak positions are distributed in the range of 199 to 202 with respect to the flower positioned on the near side and in the range of 100 to 103 with respect to the mountain positioned on the far side.

If grouping is performed in such a way as to collect frames that are similar in peak position, the imaging screen can be divided into three area, i.e., focus area 1 (i.e., an area surrounded by a fine dotted line), focus area 2 (i.e., an area surrounded by a coarse dotted line), and focus area 3 (i.e., an area surrounded by a solid line) as illustrated in FIG. 15B.

The focus areas 1 and 2 can be integrated as the same area because these areas are similar in peak position. In this case, the imaging screen can be divided into a background group corresponding to the focus areas 1 and 2 and a forehand object group corresponding to the focus area 3. Thus, the CPU 115 divides the imaging screen into a plurality of groups with reference to the distance. Further, the image processing unit 110 can perform grouping in such a way as to combine an imaging screen division result obtained with reference to a color distribution and an imaging screen division result obtained with reference to the distance. In this case, the accuracy can be enhanced.

In step S1409, the CPU 115 sets AF frames at the object position if the object has been successfully detected by the object detection module 123 or sets a predetermined number of AF frames if the object detection has failed. When it is determined to perform the continuous shooting processing, the in-focus accuracy in each AF frame tends to deteriorate because the focus evaluation value is influenced by a movement of the object or the camera. Therefore, the CPU 115 performs AF scan processing to determine the in-focus position without performing the distance-dependent area division processing.

In step S1410, the CPU 115 performs AF scan processing to determine the in-focus position. More specifically, the CPU 115 continuously performs the scan processing until a peak position can be detected in the AF frame having been set in the object detection position in the case where the object has been successfully detected. The CPU 115 continuously performs the scan processing until a group of AF frames that are similar in peak position can be detected from the multiple AF frames in the case where the object detection has failed.

In step S1411, the CPU 115 determines the in-focus position based on the peak position of each AF frame obtained in the scan processing performed in step S1410. When the object is successfully detected, the peak position is focused on the AF frame having been set in the object detection position. When the peak position cannot be detected at the AF frame having been set on the object detection position, a defocused state is confirmed. If no object can be detected, the CPU 115 determines an AF frame region to determine the in-focus position in a group of AF frames that are similar in peak position if it is obtained. A defocused state is confirmed when the group of AF frames cannot be obtained.

In step S1412, the AF processing unit 105 causes the focus lens 104 to move to the in-focus position when the in-focus position is determined in step S1405 or step S1411. The AF processing unit 105 causes the focus lens 104 to move to a fixed point having been determined beforehand (i.e., a position where the object presence probability is higher) when the in-focus position is determined and the defocused state is confirmed.

In step S1413, the CPU 115 causes the operation display unit 117 to display an in-focus frame or a defocus frame. When the in-focus position is determined, the CPU 115 displays the in-focus frame that is the AF frame positioned within the depth of field from the in-focus position. When the defocused state is confirmed, the CPU 115 displays the defocus frame at a determined position (e.g., the central position).

Figure 17A:
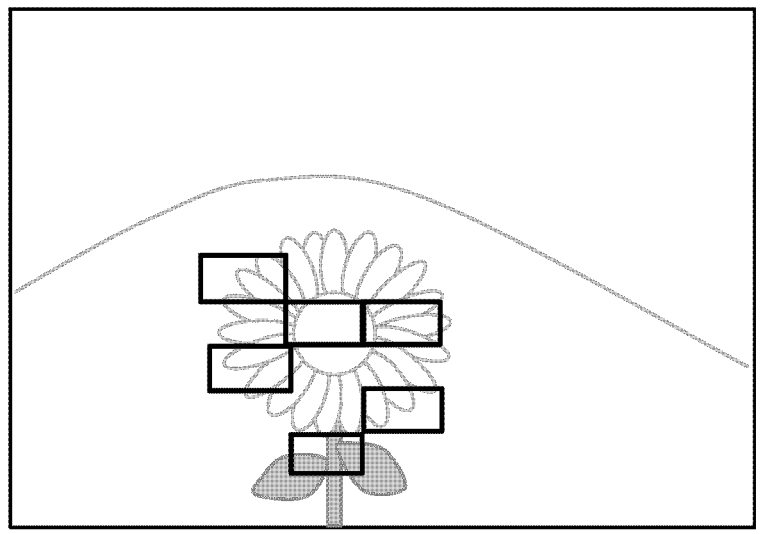
FIGS. 17A and 17B illustrate examples of in-focus frame display illustrated in FIG. 14.
Figure 17B:
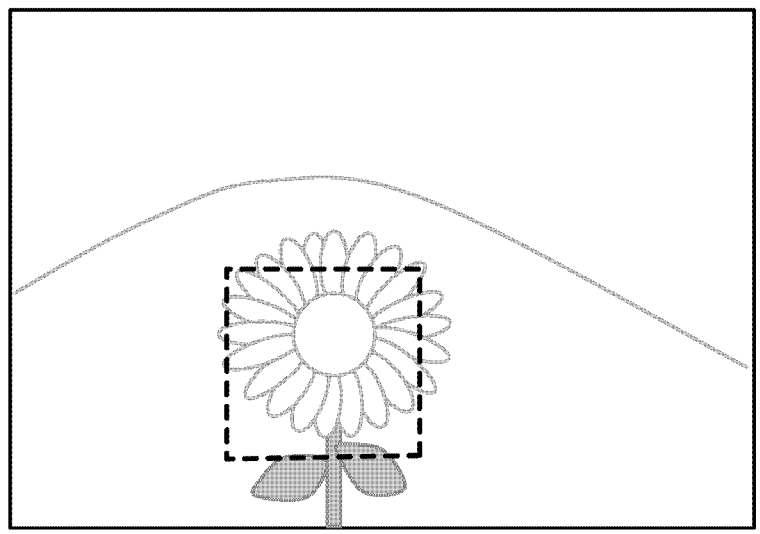

If all AF frames positioned within the depth of field from the in-focus frame are displayed as a result of the distance map acquisition scan performed in step S1404, the in-focus frame display may become so complicated because the number of the AF frames is large. Therefore, as illustrated in FIG. 17B, it is useful to newly set an in-focus display frame (i.e., an area indicated by a dotted line) in such a way as to include each AF frame positioned within the depth of field from the in-focus position (i.e., an area indicated by a bold solid line) illustrated in FIG. 17A.

<Image Capturing Processing>

FIG. 16 is a flowchart illustrating the image capturing processing to be performed in step S212 illustrated in FIG. 2. The image capturing processing includes optimizing the image capturing processing and image processing according to the bracket determination result obtained in step S208 illustrated in FIG. 2 and the equidistance determination result in the main exposure AF processing obtained in step S1407 illustrated in FIG. 14.

In step S1601, the CPU 115 confirms the processing to be performed when a shooting operation is performed, as a result of the bracket determination made in step S208 illustrated in FIG. 2. If it is determined to perform the AF bracket processing, the operation proceeds to step S1602. If it is determined to perform the AE bracket processing, the operation proceeds to step S1605. If it is determined to perform the continuous shooting processing, the operation proceeds to step S1607.

In step S1602, the CPU 115 checks if the equidistance is confirmed as a result of the equidistance determination made in the main exposure AF processing in step S1407 illustrated in FIG. 14. If the determination result is affirmative (Yes in step S1602), the operation proceeds to step S1605. Otherwise (No in step S1602), the operation proceeds to step S1603.

In step S1603, the CPU 115 determines the focus position where the AF bracket processing is to be performed based on the distance of each group divided in step S1408 illustrated in FIG. 14.

In step S1604, the CPU 115 performs an AF bracket shooting operation at the focus position determined in step S1603. In this respect, the CPU 115 performs the processing in step S1604 when a scene is determined as including a distance difference as a result of the equidistance determination processing and the AF bracket processing is effective.

In step S1605, the CPU 115 determines exposure settings for the AE bracket processing based on the exposure difference in the imaging screen acquired by the AE processing unit 103 immediately before the switch SW1 is turned on. Then, the operation proceeds to step S1606.

In step S1606, the CPU 115 performs an AE bracket shooting operation based on the exposure settings determined in step S1605.

In step S1607, the CPU 115 determines a frame rate in the continuous shooting processing based on outputs of the angular speed sensor unit 125 and the moving body detection unit 124 obtained immediately before the switch SW1 is turned on. Then, the operation proceeds to step S1608.

In step S1608, the CPU 115 performs a continuous shooting operation based on the frame rate determined in step S1607.

In step S1609, the CPU 115 generates an image by performing shading processing on each image captured in the focus bracket shooting performed in step S1604 based on the grouping result obtained in step S1408 illustrated in FIG. 14 and the distance or color distribution in the imaging screen. The CPU 115 performs the above-mentioned processing only for the scene including a distance difference, which has been identified in the equidistance determination processing. Therefore, the shading processing can be accurately performed according to the distance distribution.

In step S1610, the CPU 115 generates an image by performing processing for clipping a part of the imaging screen based on the object detection area, the grouping result obtained in step S1408 illustrated in FIG. 14, and the distance or color distribution in the imaging screen.

As described above, the imaging apparatus can determine the distance division accuracy based on the distribution of in-focus results in a plurality of AF frames and can appropriately perform the image capturing processing and the image processing based on the determined distance division. As described above, by determining a scene to be captured based on an image signal, it is feasible to appropriately perform the image processing and the image capturing processing based on the determination result.

Next, a second exemplary embodiment is described below. The second exemplary embodiment is different from the above-mentioned first exemplary embodiment in that a phase difference AF method is employed to acquire distance information about objects distributed in the imaging screen. An imaging apparatus according to the second exemplary embodiment performs "phase difference AF processing" instead of performing the above-mentioned "AF scan processing" described in the first exemplary embodiment.

Figure 18:
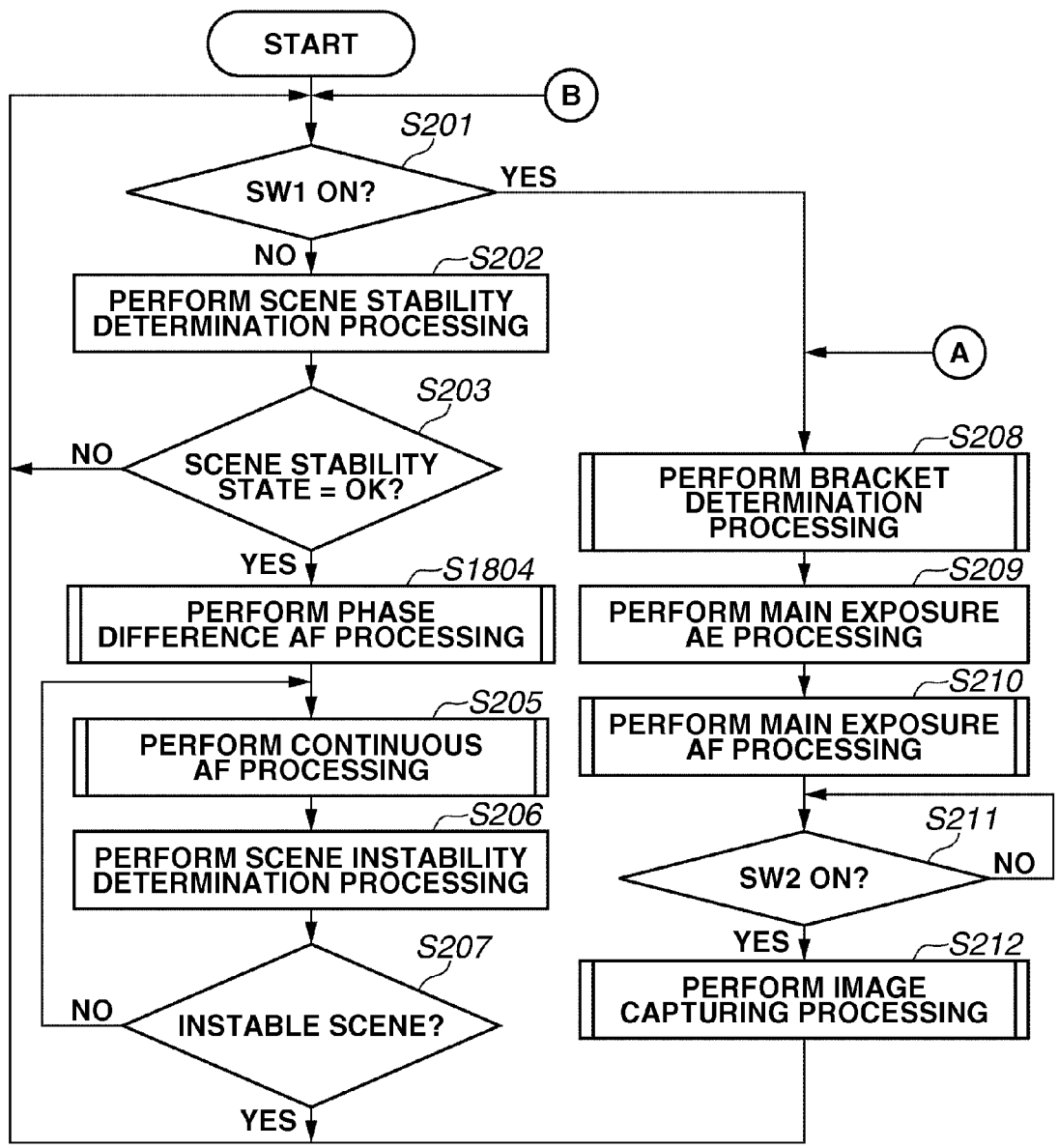
FIG. 18 is a flowchart illustrating an operation that can be performed by an imaging apparatus according to an exemplary embodiment of the present invention.

FIG. 18 is a flowchart illustrating an operation that can be performed by an electronic camera according to the second exemplary embodiment. Processing similar to that described in the first exemplary embodiment is denoted by the same step number and the redundant description thereof will be avoided.

In step S203, the CPU 115 checks if it is determined that the imaging scene is stable in step S202. If it is determined that the imaging scene is stable (Yes in step S203), the operation proceeds to step S1804. Otherwise (No in step S203), the operation returns to step S201. In step S1804, the CPU 115 performs phase difference AF processing. The phase difference AF processing is described in detail below with reference to FIG. 19.

In the second exemplary embodiment, the image sensor 108 (see FIG. 1) has an arrangement illustrated in FIGS. 20 and 21 to acquire an image signal together with phase difference AF information.

<Image Sensor Structure>

FIG. 20A is a schematic view illustrating a pixel array of the image sensor. FIG. 20A illustrates a pixel array of a two-dimensional complementary metal-oxide semiconductor (CMOS) sensor, as an example of the image sensor, according to the present exemplary embodiment. The image sensor has a pixel range of 4 rows and 4 columns.

As illustrated in FIG. 20A, each pixel group 210 has an arrangement of 2 rows and 2 columns, which includes two pixels 210G having G spectral sensitivity disposed diagonally, one pixel 210R having R spectral sensitivity, and one pixel 210B having B spectral sensitivity, in such a way as to constitute the Bayer array arrangement. Each of the pixels 210R, 210G, and 210B is constituted by two sub pixels 201a and 201b that are usable in pupil division. Therefore, each pixel can acquire an image signal together with phase difference AF information (i.e., focus detection information).

FIG. 20B is an enlarged view illustrating the pixel 210G of the image sensor illustrated in FIG. 20A. FIG. 20C is a cross-sectional view of the pixel 210G taken along a line a-a illustrated in FIG. 20B.

In the present exemplary embodiment, sub pixels disposed in all pixels are dedicated to the pupil division and are usable as focus detection pixels. However, the pixels dedicated to the pupil division and usable as focus detection pixels can be limited to only a part of the sensor surface.

<Schematic Pupil Division of Image Sensor>

FIG. 21 illustrates a pupil division state of one pixel. As illustrated in FIG. 21, one pixel includes n-type layers 301a and 301b, which are formed in such a way as to be included in a p-type layer 300, to constitute two sub pixels. Two sub pixels of each pixel are deviated in +x and −x directions, respectively. Therefore, the pupil division can be implemented using a single microlens 303. More specifically, a pupil 302a of an image signal A and a pupil 302b of an image signal B can be obtained.

In the present exemplary embodiment, sub pixels 301a are arrayed regularly in the x direction as illustrated in FIG. 20A. A first image signal acquired from these sub pixels 301a is set as the image signal A (i.e., one of two image signals obtained from paired light fluxes that have penetrated through different exit pupil areas of an imaging optical system). Further, sub pixels 301b are arrayed regularly in the x direction as illustrated in FIG. 20A. A second image signal acquired from the sub pixel group 301b is set as the image signal B (i.e., the other of two image signals obtained from paired light fluxes that have penetrated through different exit pupil areas of an imaging optical system).

Thus, it is feasible to obtain the focal position of the photographic lens by calculating a defocus amount based on a relative image deviation between the image signal A and the image signal B, using a correlation operation. It is feasible to adjust a defocused state of the photographic lens based on the calculated focal position. The above-mentioned arrangement is applicable to an object having a luminance distribution in the x direction. A similar arrangement is applicable to an object having a luminance distribution in the y direction.

Further, in the present exemplary embodiment, one pixel is constituted by two eccentric sub pixels that are disposed in one-dimensional direction to perform the above-mentioned pupil division. However, the pupil division method is not limited to the above-mentioned example. For example, it is useful to form a two-dimensional array of sub pixels divided in both the x and y directions.

Further, in the present exemplary embodiment, the pupil division is implemented using a microlens on which a plurality of sub pixels is disposed. However, the pupil division method is not limited to the above-mentioned example. For example, it is useful to form only one pixel for each microlens in an eccentric fashion and divide a pupil using pixels having different eccentric pixels to perform the focus detection.

Figure 19:
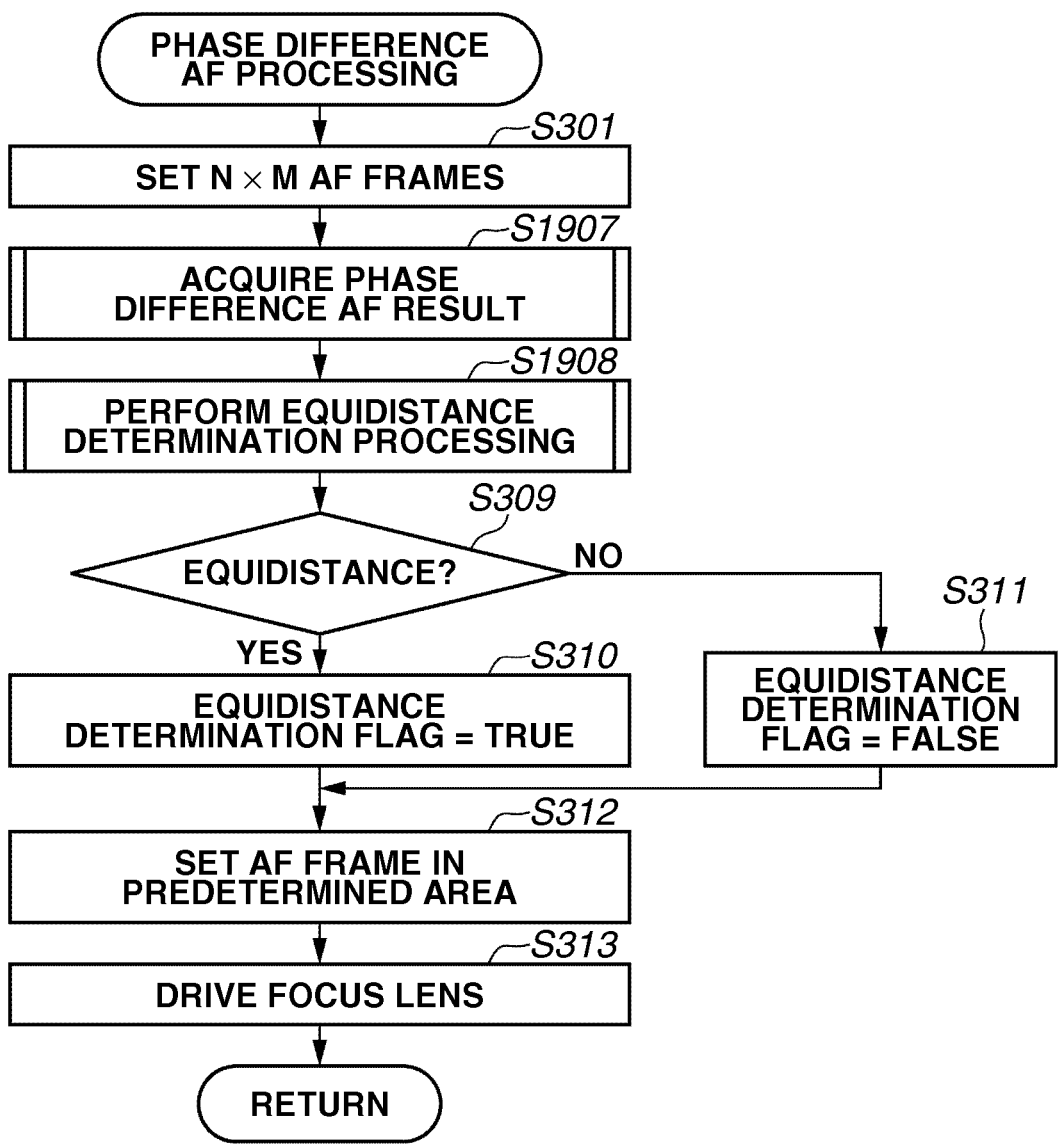
FIG. 19 is a flowchart illustrating phase difference AF processing illustrated in FIG. 18.

FIG. 19 is a flowchart illustrating the phase difference AF processing to be performed in step S1804 illustrated in FIG. 18. The phase difference AF processing includes acquiring distance information to determine a scene that includes a distance difference between objects in the imaging screen (hereinafter, referred to as "equidistance determination") and performing a phase difference AF operation to determine an in-focus position. The AF processing unit 105 and the CPU 115 cooperatively perform the following processing using the above-mentioned image sensor.

First, in step S301, the CPU 115 sets N×M focus detection areas (i.e., AF frames) in the imaging screen. FIG. 4 illustrates an AF frame setting obtainable when N=7 and M=9. Alternatively, it is useful to set the AF frame setting range considering a specific position in the imaging screen where the object has been detected by the object detection module 123. For example, the CPU 115 can set a plurality of AF frames with reference to the position of the object if it has been detected successfully.

In step S1907, as mentioned above, the CPU 115 acquires the first image signal acquired from each sub pixel 301a as the image signal A (i.e., one of two image signals obtained from paired light fluxes that have penetrated through different exit pupil areas of an imaging optical system) as the second image signal acquired from the sub pixel group 301b as the image signal B (i.e., the other of two image signals obtained from paired light fluxes that have penetrated through different exit pupil areas of an imaging optical system).

Then, the CPU 115 obtains a relative image deviation between the image signal A and the image signal B based on correlation operation, and calculates a defocus amount based on the obtained relative image deviation (which is referred to as "phase difference AF method"). Thus, it is feasible to obtain the in-focus position (i.e., the focus lens position where the object is focused) for each AF frame.

In step S1908, the CPU 115 performs equidistance determination processing. The processing to be performed in step S1908 is similar to the equidistance determination processing described with reference to FIG. 11, although the peak position in each AF frame should be replaced by the in-focus position according to the phase difference AF method. Therefore, redundant description thereof will be avoided.

Processing to be performed in steps S309 to S313 is similar to the processing described in the first exemplary embodiment.

In the above-mentioned exemplary embodiment, the scan AF processing or the phase difference AF has been performed to acquire distance information about objects distributed in the imaging screen. However, another method is employable. For example, an external-measurement phase difference AF or a GPS function is usable to acquire distance information.

Further, image capturing conditions employed for the continuous shooting (bracket) processing in the above-mentioned exemplary embodiments are as follows:

Continuous shooting condition: "fixing a focus lens position and an exposure condition in a plurality of shooting operations"

AF bracket condition: "differentiating an exposure condition in a plurality of shooting operations in such a way as to set appropriate exposure for a plurality of object areas"

AE bracket condition: "differentiating a focus lens position in a plurality of shooting operations in such a way as to bring a plurality of object areas into focused state"

However, the image capturing conditions are not limited to the above-mentioned examples. For example, when the luminance of an object is equal to or darker than a predetermined level, it is feasible to perform a continuous shooting operation with reference to a stroboscopic bracket condition: "differentiating a stroboscopic light-emitting condition in a plurality of shooting operations."

Further, it has been described that the focus lens position and the exposure condition are not changed in a continuous shooting operation. However, it is useful to fix only one AF frame (i.e., the main object area) and obtain, by tracking, a focus lens position where the AF frame is brought into focused state and an exposure condition for setting the exposure appropriately, and then applying the obtained focus lens position and the exposure condition.

Further, in the above-mentioned exemplary embodiment, the imaging apparatus performs the AE bracket processing if an imaging scene includes a predetermined exposure difference between image frames. However, it is useful to perform the AE bracket processing when an imaging scene includes an image frame captured against the sun.

The present invention is not limited to the above-mentioned exemplary embodiments. These embodiments can be modified in various ways without departing from the scope of the invention. The above-mentioned exemplary embodiments can be appropriately combined at least partly.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-285259 filed Dec. 27, 2012, which is hereby incorporated by reference herein in its entirety.

What is claimed is:

1. An imaging apparatus comprising:
an imaging unit that acquires a plurality of image signals; and
an autofocus processing unit that performs a focus adjustment operation for a focus lens based on focus evaluation values obtained in a plurality of focus detection areas set for each of the plurality of image signals; and
a control unit that performs control that causes the imaging apparatus to execute a first continuous shooting mode and a second continuous shooting mode based on the plurality of image signals,
wherein an image capturing condition in the first continuous shooting mode is different from an image capturing condition in the second continuous shooting mode,
wherein the control unit acquires a peak position in each of the plurality of focus detection areas and performs the control that causes the imaging apparatus to execute the first continuous shooting mode in a case where the plurality of focus detection areas satisfy a predetermined condition, and
wherein the predetermined condition includes that a number of peak positions within a predetermined depth of field is less than a predetermined value.

2. The imaging apparatus according to claim 1, wherein the control unit performs control that causes the imaging apparatus to execute a third continuous shooting mode, and
an image capturing condition in the third continuous shooting mode is different from the image capturing conditions in the first and second continuous shooting modes.

3. The imaging apparatus according to claim 1, wherein the image capturing condition in the first continuous shooting mode is differentiating a focus lens position in a plurality of shooting operations to bring a plurality of object areas into a focused state, and
the control unit performs the control that causes the imaging apparatus to execute the second continuous shooting mode if the plurality of focus detection areas don't satisfy the predetermined condition.

4. The imaging apparatus according to claim 3, wherein the image capturing condition in the second continuous shooting mode is differentiating an exposure condition in a plurality of shooting operations to set appropriate exposure for the plurality of object areas.

5. The imaging apparatus according to claim 1, wherein the image capturing condition in the first continuous shooting mode is differentiating a focus lens position in a plurality of shooting operations.

6. The imaging apparatus according to claim 1, wherein the control unit
divides an image frame into a plurality of object areas based on the focus evaluation values; and
performs image processing based on the plurality of object areas,
wherein the control unit performs shading processing on an image obtained in a shooting operation according to the first continuous shooting mode for each of the plurality of object areas.

7. The imaging apparatus according to claim 1, wherein the control unit
divides an image frame into a plurality of object areas based on the focus evaluation values,
performs image processing based on the plurality of object areas, and
wherein the control unit generates a clip image for each of the plurality of object areas.

8. A method for controlling an imaging apparatus, comprising:
acquiring a plurality of image signals by photoelectrically converting an object image;
acquiring a peak position in each of a plurality of focus detection areas set for each of the plurality of image signals;
performing a focus adjustment operation for a focus lens based on focus evaluation values obtained in the plurality of focus detection areas; and
performing control that causes the imaging apparatus to execute a first continuous shooting mode and a second continuous shooting mode based on the plurality of image signals,
wherein an image capturing condition in the first continuous shooting mode is different from an image capturing condition in the second continuous shooting mode,
wherein the control that causes the imaging apparatus to execute the first continuous shooting mode is performed in a case where a plurality of focus detection areas satisfy a predetermined condition, and
wherein the predetermined condition includes that a number of peak positions within a predetermined depth of field is less than a predetermined value.

9. The method according to claim 8, further comprising performing control to execute a third continuous shooting mode, wherein an image capturing condition in the third continuous shooting mode is different from the image capturing conditions in the first and second continuous shooting modes.

10. The imaging apparatus according to claim 1, wherein the predetermined condition includes that the number of peak positions in the plurality of focus detection areas, within a predetermined depth of field in which it is determined that contrast is sufficient and that an object is present is less than the predetermined value.

* * * * *